United States Patent [19]
Omura et al.

[11] Patent Number: 5,349,873
[45] Date of Patent: Sep. 27, 1994

[54] FORCE TRANSDUCER AND PRESSURE DETECTING CIRCUIT USING THE SAME

[75] Inventors: Yoshiteru Omura; Kouji Tsukada, both of Seto; Yutaka Nonomura, Nagoya; Takeshi Morikawa, Aichi, all of Japan

[73] Assignee: Kabushiki Kaisha Toyota Chuo Kenkyusho, Aichi, Japan

[21] Appl. No.: 92,480

[22] Filed: Jul. 16, 1993

[30] Foreign Application Priority Data

Jul. 16, 1992 [JP] Japan .................... 4-212082

[51] Int. Cl.$^5$ .......... G01L 1/16; G01L 1/18; G01L 9/04; G01L 1/75
[52] U.S. Cl. .......... 73/862.68; 73/DIG. 4; 73/720
[58] Field of Search .......... 73/DIG. 4, 708, 721, 73/727, 753, 861.27, 861.28, 861.29, 861.31, 862.68, 720, 726

[56] References Cited

U.S. PATENT DOCUMENTS

| | | | |
|---|---|---|---|
| 3,351,786 | 11/1967 | Muller et al. | 73/DIG. 4 |
| 4,320,664 | 3/1982 | Rehn et al. | 73/708 |
| 4,703,658 | 11/1987 | Mrozack, Jr. | 73/724 |
| 4,771,639 | 9/1988 | Saigusa et al. | 73/727 |
| 4,833,929 | 5/1989 | Omura et al. | 73/862.68 |
| 4,993,266 | 2/1991 | Omura et al. | 73/720 |
| 5,142,914 | 9/1992 | Kusakabe et al. | 73/756 |

FOREIGN PATENT DOCUMENTS 0352773 1/1990 European Pat. Off. .
48-40311 11/1973 Japan .

OTHER PUBLICATIONS

Patent Abstracts of Japan, vol. 12, No. 19 (P-657)(2866), Jan. 21, 1988, JP-A-62 175 631, Aug. 1, 1987.
Sensors and Actuators, vol. 13, No. 1, Jan. 1988, pp. 53-62, I. Igarashi, "Semiconductor Dynamic Sensors".
Sensors and Actuators, vol. 27, No. 1/3, May 1991, pp. 801-807, H. C. J. M. Van Gestel, et al., "On-Chip Piezoresistive Stress Measurement in Three Directions".
Journal of Applied Physics, vol. 32, No. 10, Oct. 1961, pp. 2008-2019, W. G. Pfann, et al.

*Primary Examiner*—Richard E. Chilcot, Jr.
*Assistant Examiner*—William L. Oen
*Attorney, Agent, or Firm*—Oblon, Spivak, McClelland, Maier & Neustadt

[57] ABSTRACT

A force transducer comprising: a silicon semiconductor having a crystal face of (110); a pair of input-output shared electrodes mounted on the crystal face of the silicon semiconductor in mutual confronting relationship in a direction of <110> of the crystal or a direction equivalent to the direction of <110>; a force transmission block connected to the crystal face of the silicon semiconductor for transmitting a force W perpendicularly to the crystal face; and a support bed supporting the silicon semiconductor and connected to the silicon semiconductor at a face opposite to the crystal face to which the force transmission block is connected, whereby a voltage corresponding to the force W and to be measured is output from the input-output shared electrodes when the force W is applied perpendicularly to the crystal face of the silicon semiconductor via the force transmission block while a current flows in the silicon semiconductor via the input-output shared electrodes.

25 Claims, 13 Drawing Sheets

FORCE TRANSDUCER AND PRESSURE DETECTING CIRCUIT USING THE SAME

BACKGROUND OF THE INVENTION

1. Field of the Invention

This invention relates to a force transducer which converts a force into an electrical signal using the piezoresistive effect of a semiconductor and also to a pressure detecting circuit using the force transducer, and more particularly to such device and circuit which produces a voltage output corresponding to a force which is applied perpendicularly to the crystal face of a silicon semiconductor while a current flows in the silicon semiconductor.

2. Description of the Related Art

Force transducers are widely used in various fields as force detecting sensors and are therefore requested to have such an ability as to measure a force precisely with no influence by the environment.

On many occasions force transducers are used in a very severe environment. In recent years, force transducers have been used under high temperature environment for measuring the pressure in an engine cylinder in order to control the ignition timing of the engine according to the measured pressure.

Force transducers used under such circumstances are required to measure steadily the pressure of combustion gas pressure in the engine with good responsiveness in a wide range of the temperature environment.

FIGS. 16A and 16B show an example of a prior art force transducer (U.S. Pat. No. 4,833,929); FIG. 16A is a schematic plan view of the sensor, and FIG. 16B is a schematic side view of the sensor.

This prior art combustion pressure sensor comprises a rectangular planar p-type silicon semiconductor 10 (having a resistivity of 8 $\Omega$cm and a thickness of about 200 $\Omega$m) with a crystal face (110) 10a on which a force W is to be applied, a force transmission block 30 connected to the crystal face 10a of the silicon semiconductor 10 for transmitting the force W perpendicularly to the crystal face 10a, and a support bed 20 connected to the other face of the silicon semiconductor 10. The force transducer is constructed in such a manner that a combustion gas pressure P in a non-illustrated engine cylinder acts as a force perpendicularly on the top face 30a of the force transmission block 30 via a diaphragm. At that time, the force W can be obtained by the equation W = P$\times$A where A is a pressure receiving area of the diaphragm.

A pair of confronting input electrodes 14, 14' are formed on the silicon semiconductor 10 at an angle of 45 degrees going away anticlockwise from the direction of <110> of the crystal. A current flows from a power supply to the silicon semiconductor 10 via the input electrodes 14, 14'.

Similarly, a pair of confronting output electrodes 12, 12' is formed on the silicon semiconductor 10 at an angle 45 degrees going away anticlockwise from the direction of <001> of the crystal. When a force W is applied perpendicularly to the crystal face 10a of the silicon semiconductor 10, the output electrodes 12, 12' output a voltage corresponding to the force W by the piezoresistive effect of the silicon semiconductor. It is therefore possible to measure the force W and hence the combustion gas pressure P (hereinafter called "combustion pressure) by measuring the output voltage.

Specifically, when a force W is applied on the crystal face 10a of the silicon semiconductor 10 via the force transmission block 30, a voltage $V_{sens}$ to be outputted from the output electrodes 12, 12' is a superposed voltage of a so-called offset voltage $V_{off}$ and a voltage output $\Delta V_{OLD}$ which is given by Equation 1:

$$\Delta V_{OLD} = I \times R \times \pi_{63}' \times \sigma_Z = V \times \pi_{63}' \times \sigma_Z \quad \text{[Equation 1]}$$

where I is the current (A) flowing in the silicon semiconductor, R is the resistance ($\Omega$) between the input electrodes, V is the voltage (V) impressed to the silicon semiconductor, $\pi_{63}'$ is the piezoresistive coefficient (cm$^2$/kg) of the silicon semiconductor of FIGS. 16A and 16B, and $\sigma_Z$ is the compressive stress generated on the crystal face 10a.

The piezoresistive coefficient $\pi_{63}'$ in Equation 1 may alternatively be expressed by Equation 2 as disclosed in "Use of Piezoresistive Materials in the Measurement of Displacement, Force and Torque" by R. N. Thurston, THE JOURNAL OF THE ACOUSTICAL SOCIETY OF AMERICA, Vol. 29, No. 10, October 1957. For example, in the case of a p-type silicon crystal having a resistivity of about 8 $\Omega$cm, the piezoresistive coefficient $\pi_{63}'$ can be calculated as about $-33 \times 10^{-6}$cm$^2$/kg.

$$\pi_{63}' \approx \frac{1}{4}(\pi_{11} - \pi_{12} - \pi_{44}) \quad \text{[Equation 2]}$$

In Equation 2, $\pi_{11}$, $\pi_{12}$ and $\pi_{44}$ are the piezoresistive coefficients of a cubic crystal. For example, in the case of a p-type silicon crystal having a resistivity of about 8 $\Omega$cm, $\pi_{11}$32 $6 \times 10^{-6}$cm$^2$/kg, $\pi_{12} = -1 \times 10^{-6}$cm$^2$/kg and $\pi_{44} = 138 \times 10^{-6}$cm$^2$/kg.

Accordingly, given that a housing having the diaphragm is equipped with, as a pressure detecting means, a force transducer 2000 of FIGS. 16A and 16B having a silicon semiconductor 10, which is known as a highly elastic material, it is possible to realize a combustion pressure sensor which is also able to measure a static pressure.

However, the prior force transducer 2000 has the following problems.

First Problem

The prior force transducer 2000 requires a pair of input electrodes 14, 14' and a pair of output electrodes 12, 12', both pair to be mounted on the silicon semiconductor 10. If the force transducer 2000 is to be assembled in a housing to constitute a combustion pressure sensor, it requires four lead wires to be connected to the respective electrodes 12, 12', 14, 14'.

The combustion pressure sensor, whose object is to detect the pressure-in-cylinder information more accurately, is mounted directly on an engine. It is a common knowledge that if it is mounted on the engine, the combustion pressure sensor should be left unprotected in a severe environment which has some fear that the sensor might be influenced such as by heat, vibration and external turbulent magnetic field. It can be said that the degree of reliability at the joints which tend to receive heat, vibration, etc. is proportional to the number of lead wires. With this arrangement, because four lead wires and hence many lead wires are used, high-reliability of the joints and low cost of production cannot be achieved. Consequently a force transducer which is simple in structure with the lead wires reduced in number in an effort to secure the high reliability and low cost of production has been desired.

Second Problem

In the prior force transducer 2000, since its output voltage is small, the voltage output tends to be influenced by external turbulent magnetic field if it is used as a combustion pressure sensor. Therefore a force transducer which is able to output a higher voltage has been looked for.

Third Problem

If the combustion pressure sensor is mounted on an engine, the force transducer 2000 assembled in the combustion pressure sensor is left unprotected in a high-temperature environment. More particularly, if the engine is operated at a high r.p.m., the temperature of the force transducer 2000 would often reached to 150° C. or higher. However it is also common knowledge that the silicon semiconductor 10 to be used in the force transducer 2000 is made of a highly elastic material but its resistivity and piezoresistive effect are highly dependent on temperature.

Especially the silicon semiconductor 10 constituting the force transducer 2000 of FIGS. 16A and 16B has a high resistivity of about 8 Ωcm (i.e., a low impurity concentration) and is remarkably dependent on temperature; the temperature dependency is about 0.8%/°C. in resistivity and about −0.25%/°C. in piezoresistive effect. The resistivity and the piezoresistive effect here are equivalent to the inter-input-electrode resistance R (hereinafter called "the input resistance") and the piezoresistive effect $\pi_{63}'$ of Equation 1. In the prior force transducer 2000, since these values are highly dependent on temperature, the voltage $\Delta V_{OLD}$ varies with temperature so that precise detection of the combustion gas pressure P cannot be achieved.

Fourth Problem

The prior force transducer 2000 is encountered with a phenomenon that the input resistance is sharply dropped in a range of 150° C. to 200° C., which results from a physical characteristic that the silicon semiconductor 10 having a resistivity of about 8 Ωcm possesses in nature.

Consequently, with the prior combustion pressure sensor employing this force transducer 2000, it is absolutely impossible to measure the combustion pressure P of the engine under the high-temperature and high-pressure operating conditions in which the temperature exceeds 200° C., and so it has been the desired object to extend the usable temperature range of the sensor to cover higher temperatures.

SUMMARY OF THE INVENTION

It is therefore an object of this invention to provide a highly precise and reliable force transducer in which the number of lead wires to be used can be reduced and which has an excellent temperature characteristic and can be used in a wider temperature range.

Another object of the invention is to provide a pressure detecting circuit employing the force transducer described in the previous paragraph.

According to a first aspect of the invention, there is provided a force transducer comprising:
(a) a silicon semiconductor having a face of (110) or a crystal face equivalent to the face of (110), on which a force is to be applied;
(b) a pair of input-output shared electrodes mounted on the crystal face of the silicon semiconductor in mutual confronting relationship in a direction of , <110> of the crystal or a direction equivalent to the direction of <110>;
(c) a force transmission block connected to the crystal face of the silicon semiconductor for transmitting the force perpendicularly to the crystal face; and
(d) a support bed supporting the silicon semiconductor and connected to the silicon semiconductor at a face opposite to the crystal face to which the force transmission block is connected, whereby a voltage corresponding to the force and to be measured is output from the input-output shared electrodes when the force is applied perpendicularly to the crystal face of the silicon semiconductor via the force transmission block while a current flows in the silicon semiconductor via the input-output shared electrodes.

Preferably, the silicon semiconductor has an SOI (silicon on insulator) structure having a silicon semiconductor layer for detecting the force by utilizing the piezoresistive effect, and the silicon semiconductor layer is a p-type semiconductor controlled to an impurity concentration of about $5 \times 10^{18}$ atoms/cm$^3$ or about $2 \times 10^{20}$ atoms/cm$^3$.

According to a second aspect of the invention, there is provided a pressure detecting circuit comprising:
(I) the above-mentioned force transducer;
(II) a constant current source for supplying a constant current to the input-output shared electrodes; and
(III) means for measuring the force, which is applied perpendicularly to the crystal face, based on the voltage output from the input-output shared electrodes.

The means for measuring the force includes (a) a coefficient memory in which a relation between the offset voltage and a temperature compensation coefficient is stored, (b) a voltage detector for detecting the offset voltage output from the input-output shared electrodes and for detecting the voltage output from the input-output shared electrodes when the force is applied to the crystal face, and (c) a temperature compensator for reading a temperature compensation coefficient corresponding to the detected offset voltage from the coefficient memory and for temperature-compensating the output of the voltage detector to calculate and output a voltage corresponding to the force, whereby the force applied perpendicularly to the crystal face is measured, based on the output of the temperature compensator, with no influence by temperature change.

According to a third aspect of the invention, there is provided a pressure detecting circuit comprising:
(I) the above-mentioned force transducer;
(II) a voltage divider in which a resistor is connected in series to the force transducer;
(III) a constant voltage source for impressing a constant voltage to the voltage divider; and
(IV) means for measuring the force, which is applied perpendicularly to the crystal face, based on the voltage output from the voltage divider.

The means for measuring the force includes (a) a coefficient memory in which a relationship between the offset voltage and a temperature compensation coefficient is stored, (b) a voltage detector for detecting the offset voltage output from said voltage divider and for detecting the measured voltage output from said voltage divider when the force is applied on said crystal face, and (c) a temperature compensator for reading a temperature compensation coefficient corresponding to the detected offset voltage from said coefficient memory and for temperature-compensating the output of said voltage detector to calculate and output a voltage corresponding to the force, whereby the force applied perpendicularly to the crystal face is measured, based on the output of said temperature compensator, with no influence by temperature change.

The construction and operation of this invention will now be described.

FIG. 1 shows the primary structure of the force transducer 1000 of this invention. The force transducer 1000 comprises a silicon semiconductor 40 having a face 40a of (110), on which a force W is to be applied, or a crystal face equivalent to the face 40a of (110), a pair of confronting input-output shared electrodes 42, 42' mounted on the crystal face 40a of the silicon semiconductor 40 in a direction of <110> of the crystal or a direction equivalent to the direction of <110> , a force transmission block 60 connected to the crystal face 40a of the silicon semiconductor 40 for transmitting the force W perpendicularly to the crystal face 40a , and a support bed 70 supporting the silicon semiconductor 40 and connected to the silicon semiconductor 40 at a face opposite to the face on which the force transmission block 60 is connected.

A voltage corresponding to the force W and to be measured will be output from the input-output shared electrodes 42, 42' when the force W is applied perpendicularly to the crystal face 40a of the silicon semiconductor 40 via the force transmission block 60 while a current flow in the silicon semiconductor 40 via the input-output shared electrodes 42, 42'.

With the force transducer 1000 of this invention, the two input-output shared electrodes 42, 42' are connected to a power supply 100 and a voltage detector 110 via two lead wires 44, 44', to supply current to the silicon semiconductor 40 and detect a voltage created between the two electrodes 42, 42'.

As described above, in this force transducer 1000, since the number of lead wires to be used is reduced from four to two, it is possible to guarantee high reliability at the joints of the lead wires and to reduce the cost of production.

Given that the number of lead wires is reduced to a half, the combustion pressure sensor employing the force transducer 1000 can measure the combustion pressure precisely with less influence such as by heat, vibration and external turbulent magnetic field.

The force transducer 1000 utilizes a piezoresistive coefficient $\pi_{13}'$. The piezoresistive coefficient $\pi_{13}'$ of the silicon semiconductor 40 is a piezoresistive coefficient when the direction of detection of voltage and the current flow direction are same and a single-axis stress is generated perpendicularly to such direction.

FIG. 3 represents the piezoresistive coefficient $\pi_{13}'$ when a force W is applied on the crystal face (110) 40a of the p-type silicon semiconductor 40 having a resistivity of 8 Ωcm, with the confronting input-output shared electrodes 42, 42' mounted on the silicon semiconductor 40. In FIG. 3, the piezoresistive coefficient $\pi_{13}'$ is represented on a circular graph when it is measured as the direction of location of the input-output shared electrodes 42, 42' relative to the <110> plane of silicon throughout the range of 360 degrees.

As is apparent from FIG. 3, $-66 \times 10^{-6} cm^2/kg$, the maximal value of the piezoresistive coefficient $\pi_{13}'$, can be obtained if the input-output shared electrodes 42, 42' are formed in the crystal direction <110>.

The piezoresistive coefficient $\pi_{13}'$ in the crystal direction <110> can be given by Equation 3, as compared to Equation 2. As is seen from Equation 3, the piezoresistive coefficient $\pi_{13}'$ of the force transducer 1000 is about twice as large as the piezoresistive coefficient $\pi_{63}'$ of the prior force transducer 2000 of FIGS. 16A and 16B.

$$\pi_{13}' = \frac{1}{2}(\pi_{11} + \pi_{12} - \pi_{44}) = 2 \times \pi_{63}' \quad \text{[Equation 3]}$$

$$\pi_{12} << (\pi_{11} - \pi_{44})$$

Therefore, if it is under the same conditions except the piezoresistive coefficient, a voltage output $\Delta V_{NEW}$ to be superposed by an offset voltage between the input-output shared electrodes 42, 42' of the force transducer 1000 will be approximately double the conventional voltage output $\Delta V_{OLD}$, as shown in Equation 4.

$$\begin{aligned}\Delta V_{NEW} &= I \times R \times \pi_{13}' \times \sigma_Z = V \times \pi_{13}' \times \sigma_Z \\ &= V \times 2 \times \pi_{63}' \times \sigma_Z = 2 \times \Delta V_{OLD}\end{aligned} \quad \text{[Equation 4]}$$

In the force transducer 1000, since its output voltage $\Delta V_{NEW}$ is about twice as large as that of the prior force transducer 2000, it is possible to detect the force with increased precision and to reduce the number of lead wires so that high reliability and low cost of production can be secured.

For example, if the force transducer 1000 is used as a combustion pressure sensor, it is possible to measure the combustion pressure such as of an internal engine precisely, with no influence such as by external turbulent magnetic field.

In the force transducer 1000, when the temperature of the silicon semiconductor 40 varies, the resistance and the piezoresistive coefficient between the input-output shared electrodes 42, 42' also vary sharply depending on the temperature. Consequently, as the ambient temperature of the force transducer 1000 varies, the voltage output of the electrodes 42, 42' fluctuates. The force transducer 1000 therefore requires means for compensating the voltage output according to the ambient temperature.

The resistance of the silicon semiconductor 40 which constitutes the force transducer 1000 is very dependent on temperature; that is, precise temperature information can be obtained by detecting the resistance value.

In the pressure detecting circuit of the invention, using a constant current supply as a power supply 100, a resistance value of the silicon semiconductor 40 is obtained in terms of an offset voltage to be output from the electrodes 42, 42' when the force W =0 . Here the term "offset voltage" means a voltage value between the electrodes 42, 42' of the force transducer 1000 when the pressure is zero.

Based on the obtained offset voltage, the voltage output of the force transducer 1000 is temperature-compensated to calculate the force W.

A temperature-compensating means in the case where a combustion pressure sensor is constituted using the force transducer will now be described.

FIGS. 4A and 4B show a pressure waveform of reciprocating engine of the four-cycle type in which pressure varies every moment during individual stages of intake, compression, combustion and exhaust, the pressure values being measured in terms of the interelectrode voltage values of the force transducer 1000 assembled in the combustion sensor. The force transducer 1000 is constant-current-driven by the power supply 100 and the output of the electrodes 42, 42' is detected by a voltage detector 110. FIG. 4A shows the pressure waveform from intake 1 to exhaust 1 when the force transducer 1000 is located in a temperature environment that is lower in temperature than the pressure waveform from intake 2 to exhaust 2 of FIG. 4B.

In FIGS. 4A and 4B, $P_0$ is the pressure in the cylinder in the intake stage, $V_{off1}$ and $V_{off2}$ are the output voltage values (offset voltages) of the force transducer 1000.

FIG. 5 is a graph of actually measured data, showing the relationship between temperature of the silicon semiconductor 40 and the offset voltage while a constant current flows from the power supply 100 into the silicon semiconductor 40. Specifically, while a constant current of 1 mA flows from the power supply 100 into the p-type silicon semiconductor 40, whose input resistance and resistivity are 1 kΩ and about 8 Ωcm, via the electrodes 42, 42', the offset voltages were measured by the voltage detector 110, which is connected parallel to the power supply 100, over a temperature range up to 150° C.

As is apparent from FIG. 5, the offset voltage $V_{off}$ of the silicon semiconductor 40 correlates with temperature. It is therefore possible to obtain precise temperature information by detecting the offset voltage.

In FIG. 4, $P_1$ is the maximal pressure in the combustion stage. The maximal pressure $P_1$ is set in such a manner that it will be the same value at the time of low-temperature measurement of FIG. 4A and at the time of high-temperature measurement of FIG. 4B. But the voltage output $\Delta V_{NEW}$ contained in the output $V_{sens}$ of the force transducer 1000 will be different between at the time of low-temperature measurement and at the time of high-temperature measurement. This is because the input resistance and piezoresistive coefficient $\pi_{13}'$ of the silicon semiconductor 40 are dependent on temperature both at the time of low-temperature measurement and at the time of high-temperature measurement.

FIG. 6 is a characteristic graph showing the temperature dependency of the voltage output when a constant stress $\sigma_{Z}=1000$ kg/cm² is applied to the force transducer 1000 while a constant current of 1 mA flows in the force transducer 1000 which has the temperature dependency shown in FIG. 5.

As is seen from FIG. 6, even though the stress $\sigma_Z$ is constant, the voltage output of the force transducer 1000 will gradually increase along with the temperature rise. Therefore, as shown in FIGS. 4A and 4B, even if the same pressure $P_1$ is applied on the force transducer 1000 via the diaphragm both at the time of low-temperature measurement and at the time of high-temperature measurement, $\Delta V_{NEW1}$ and $\Delta V_{NEW2}$ contained in the output voltage of the force transducer 1000 will be different from each other. Consequently, the voltage output of the force transducer 1000 must be compensated according to temperature change of the silicon semiconductor 40.

FIG. 7 is a graph in which the y axis of FIG. 6 is changed from the voltage output to the temperature compensation coefficient based on the voltage output at room temperature, showing the correlation between the temperature and the temperature compensation coefficient while the force transducer 1000 is constant current driven.

FIG. 8 shows the correlation between the offset voltage and the temperature compensation coefficient while the force transducer 1000 is constant current driven. The graph of FIG. 8 may be obtained by exchanging the temperature of FIG. 7 for the offset voltage of FIG. 5.

Therefore, for example, when the actual pressure $P_1$ at the low-temperature measurement of FIG. 4A is to be obtained, an operating temperature, which corresponds to the offset voltage $V_{off1}$, of the silicon semiconductor 40 is obtained based on the graph of FIG. 5, and then a temperature compensation coefficient f ($V_{off1}$) corresponding to the operating temperature is obtained from FIG. 7, and then the obtained temperature compensation coefficient is multiplied by $\Delta V_{NEW1}$. The temperature-compensated voltage output has thus been obtained.

Likewise, the voltage output at the time of high-temperature measurement of FIG. 4B is temperature-compensated.

At that time, if the same pressure $P_1$ is applied, the temperature-compensated voltage outputs at the time of low-temperature measurement and at the time of high-temperature measurement are same.

In order to carry out the foregoing algorithms, as shown in FIG. 1, the pressure detecting circuit comprises the force transducer 1000, a constant current source (i,e, the power supply 100) for supplying a constant current to the input-output shared electrodes 42, 42', and the measuring means for measuring the force W applied perpendicularly to the crystal face 40a of the silicon semiconductor 40 via the force transmission block 60, based on the output voltage of the input-output shared electrodes 42, 42'.

The measuring means includes the coefficient memory in which the relationship between the offset voltage and the temperature compensation coefficient is stored, the voltage detector for detecting the offset voltage output from the input-output shared electrodes 42, 42' and for detecting the measured voltage output from the input-output shared electrodes 42, 42' when the force W is applied to the crystal face; 40a, and the temperature compensator for reading from the coefficient memory the temperature compensation coefficient corresponding to the detected offset voltage and for calculating a temperature-compensated voltage corresponding to the force from the output of the voltage detector and outputting the temperature-compensated voltage. Thereby the force W applied perpendicularly to the crystal face 40a is measured based on the output of the temperature compensator, with no influence by temperature change.

The relationship between the voltage $V_{sens}$, which is obtained from the combustion sensor, and the voltage outputs $\Delta V_{NEW}$ and $V_{off}$ when the actual pressure P is applied on the force transducer 1000 via the diaphragm of the combustion sensor is given by Equation 5, based on the foregoing algorithms.

$$\Delta V_{NEW} = (V_{sens} - V_{off}) \times f(V_{off}) \quad \text{[Equation 5]}$$

where f($V_{off}$) is the temperature compensation coefficient to be determined by the offset voltage $V_{off}$.

In the pressure detecting circuit, a constant current is supplied from the power supply 100 to the silicon semiconductor 40 to drive the force transducer 1000. In the absence of the force W applied, the pressure detecting circuit detects the voltage, which is output from the electrodes 42, 42', as the offset voltage $V_{off}$ and reads from the coefficient memory the temperature compensation coefficient $f(V_{off})$ corresponding to the offset voltage $V_{off}$.

Then a force W is applied via the force transmission block 60, whereupon the voltage $V_{sens}$ output from the input-output shared electrodes 42, 42' is detected. The temperature compensator substitutes the detected voltage $V_{sens}$, the offset voltage $V_{off}$ and the temperature compensation coefficient $f(V_{off})$ in Equation 5 and outputs a temperature-compensated voltage $V_{sens}'$.

Since the obtained voltage $V_{sens}'$ corresponds to the force W always with no influence by the temperature of silicon semiconductor 40, it is possible to obtain the force W precisely based on the temperature-compensated output voltage $V_{sens}'$, with no influence by temperature change.

In the foregoing pressure detecting circuit, the voltage output is temperature-compensated while the force transducer 1000 is driven by constant current.

Another pressure detecting circuit, as shown in FIG. 10, comprises a voltage divider 120 in which a resistor 122 is connected in series to the force transducer 1000, a constant voltage source 100 for impressing a constant voltage to the voltage divider 120, and a measuring means for measuring the force W based on the divided voltage output from the voltage divider 120.

The measuring means includes the coefficient memory in which the relationship between the offset voltage and the temperature compensation coefficient is stored, the voltage detector for detecting the offset voltage output from the voltage divider 120 and for detecting the voltage output from the voltage divider 120 when the force W is applied to the crystal face 40a of the silicon semiconductor 40, and the temperature compensator for reading from the memory the temperature compensation coefficient corresponding to the detected offset voltage and for calculating from the output of the voltage detector a temperature-compensated voltage corresponding to the force W and outputting the temperature-compensated voltage. Thereby the force W applied perpendicularly to the crystal face 40a is measured based on the output of the temperature compensator, with no influence by temperature change.

As shown in FIG. 10, the silicon semiconductor 40 of the force transducer 1000 is a p-type silicon semiconductor having a resistivity of about 8 Ωcm and an input resistance of 1 kΩ. If the output resistor 122 has a resistance of 500 Ω and the constant voltage source supplies an output voltage of 1 V, the offset voltage, which is measured by a voltmeter 110, of the force transducer 1000 is dependent on temperature as shown in FIG. 11. As is apparent from FIG. 11, since the offset voltage gradually increases along with the temperature rise, it is possible to temperature-compensate the voltage output by utilizing the temperature-dependency of the offset voltage.

If the force W is applied to the force transducer 1000 of FIG. 10, it will be output as converted into a voltage output $\Delta V_{NEW}$ by the piezoresistive coefficient $\pi_{13}'$ of the silicon semiconductor 40 as given by Equation 6.

$$\Delta V_{NEW} = V \times \pi_{13}' \times \sigma_Z \qquad \text{[Equation 6]}$$

The voltage output $\Delta V_{NEW}$ has a negative temperature-dependency gradually decreasing with the temperature rise, shown in FIG. 9. This is because the piezoresistive coefficient $\pi_{13}'$ has a great negative temperature dependency.

This pressure detecting circuit detects the offset voltage $V_{off}$ of the force transducer 1000 and reads the temperature compensation coefficient corresponding to the offset voltage $V_{off}$ from the coefficient memory. Then when the force W is applied to the force transducer 1000, the pressure detecting circuit detects the voltage output of the force transducer 1000 as a measured voltage and calculates a temperature-compensated voltage corresponding to the force W, based on the measured voltage, the offset voltage and the temperature compensation coefficient.

Thus it is possible to measure the force W precisely based on the calculated output, with no influence by temperature change.

With the force transducer of this invention, it is possible to improve the temperature-dependency of the resistance and piezoresistive coefficient $\pi_{13}'$ of the silicon semiconductor 40 by increasing the impurity concentration and it is also possible to avoid a phenomenon in which the resistance will drop sharply within a range of 150° C. to 200° C.

Particularly in the field of semiconductor pressure sensor, it is known that by forming a p-type strain gauge having an impurity concentration of $5 \times 10^{18}$ atoms/cm$^3$ or about $2 \times 10^{20}$ atoms/cm$^3$ on a diaphragm of the silicon semiconductor by diffusion and then driving the strain gauge by constant current, it is possible to temperature-compensate the voltage output with no necessity of a separate compensator.

Assuming that the technology for increasing the impurity concentration is applied to the silicon semiconductor 40 of the force transducer 1000 of the present invention, the silicon semiconductor 40 has a thickness of hundreds μm so that the resistance would be around several Ω. If the resistance is small, the constant current source requires a great power supply capacity and the electric power consumption would increase.

If the p-n connection region was formed employing the diffusion technology, there would have occurred current leakage at high temperature. Accordingly the above-mentioned fourth problem cannot be solved.

Assuming that the impurity concentration is to be increased, it is significant to form a rectangular planar silicon semiconductor 40 as a thin layer.

To this end, in the force transducer, the silicon semiconductor 40 is formed as an SOI (silicon on insulator) and also as a p-type silicon semiconductor layer having an impurity concentration of about $5 \times 10^{18}$ atoms/cm$^3$ or about $2 \times 10^{20}$ atoms/cm$^3$.

The means for realizing the SOI structure is exemplified by SDB (silicon direct bonding) and SIMOX (separation by implanted oxygen).

In the silicon semiconductor layer 40 having an impurity concentration of about $5 \times 10^{18}$ atoms/cm$^3$ or $2 \times 10^{20}$ atoms/cm$^3$ and electrically insulated as an SOI structure, as temperature rises, the piezoresistive coefficient decreases while the resistance increases. This increase of the resistance causes the increase of the voltage, which is to be impressed to the force transducer as driven by constant current, to cancel the decrease of the piezoresistive coefficient. It is therefore possible to realize a force transducer which would require no compensating circuit and would be free from any current leakage even at a high temperature exceeding 200°C.

As described above, according to this invention, it is possible to provide a force transducer which is reduced in number of lead wires to cause high reliability and low cost of production in comparison with the prior art. Further, since the voltage output of the force transducer increases twofold, it is possible to measure a force precisely with no influence such as by external turbulent magnetic field. Particularly in the case of a combustion sensor of an internal engine, it is possible to detect information about the pressure to the engine cylinder precisely so that the engine can be controlled more precisely based on the result of detection.

In addition, since the silicon semiconductor constituting part of the force transducer is in the SOI structure having a predetermined impurity concentration, it is possible to measure the force accurately even if the force transducer is left unprotected in a severe temperature environment. Particularly in the case of a combustion pressure sensor, it is possible to measure the combustion pressure accurately even under severe high temperature environment, under which the conventional measurement could not be realized.

Furthermore, according to the pressure detecting circuit of this invention, it is possible to decrease the temperature-dependency of the voltage output of the force transducer so that the force can be measured accurately even under severe temperature environment. Particularly assuming that the pressure detecting circuit of this invention is applied to a combustion pressure sensor to be used under the environment in which temperature fluctuates severely, it is possible to measure the combustion pressure accurately, with no influence by temperature change.

DETAILED DESCRIPTION

First Embodiment

Figure 1:
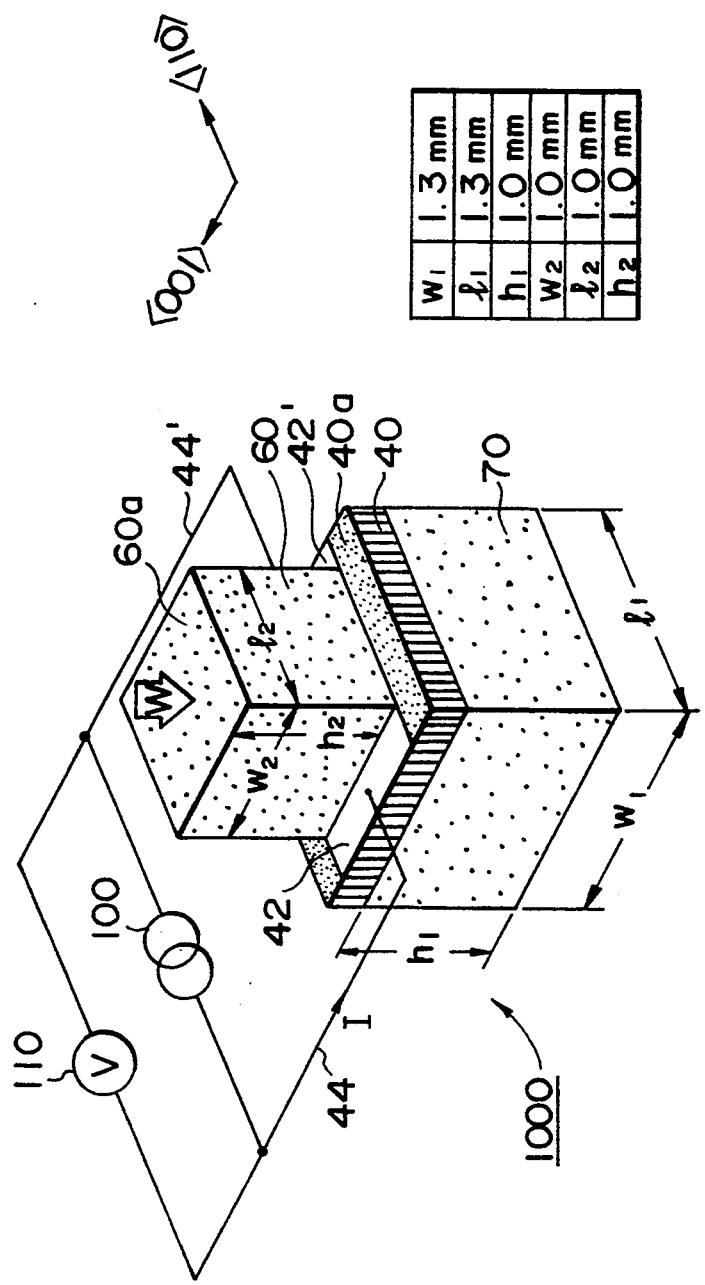
FIG. 1 is a schematic perspective view showing a force transducer according to a first embodiment of this invention.

FIG. 1 shows a force transducer 1000 according to a first embodiment of this invention.

A silicon semiconductor 40 is a p-type silicon semiconductor having a resistivity of about 8 $\Omega$cm, a width $w_1$ of 1.3 mm, a length $l_1$ of 1.3 mm and a thickness of about 100 $\lambda$m. This silicon semiconductor contains p-type impurities in a concentration of $4 \times 10^{18}$ to $6 \times 10^{18}$ atoms/cm$^3$ or $1 \times 10^{20}$ to $3 \times 10^{20}$ atoms/cm$^3$.

A force transmission block 60 of glass ceramic is fixed centrally to a crystal face (110) 40a of the silicon semiconductor 40 by electrostatic connection. The force transmission block 60 is a cube having a width $w_2$ of 1.0 mm, a length $l_2$ of 1.0 mm and a height $h_2$ of 1.0 mm and transmits a force W, which is applied on its top face 60a, perpendicularly to the crystal face 40a of the silicon semiconductor 40.

To the other face of the silicon semiconductor 40, a support bed 70 of glass ceramic is fixed by electrostatic connection for supporting the silicon semiconductor 40. The support bed 70 has a width $w_1$ of 1.3 mm, a length $l_1$ of 1.3 mm and a height $h_1$ of 1.0 mm.

Further, a pair of input-output shared electrodes 42, 42' is formed on the crystal face 40a of the silicon semiconductor 40, confronting each other in the direction of <110>. The electrodes 42, 42' are formed by evaporation of aluminum over the crystal face 40a. To the electrodes 42, 42', a power supply 100 and a voltage detector 110 are connected by two lead wires 44, 44', respectively. While a current flows from the power supply 100 to the silicon semiconductor 40 via the electrodes 42, 42', a voltage output from the electrodes 42, 42' is detected by the voltage detector 110.

Figure 2:
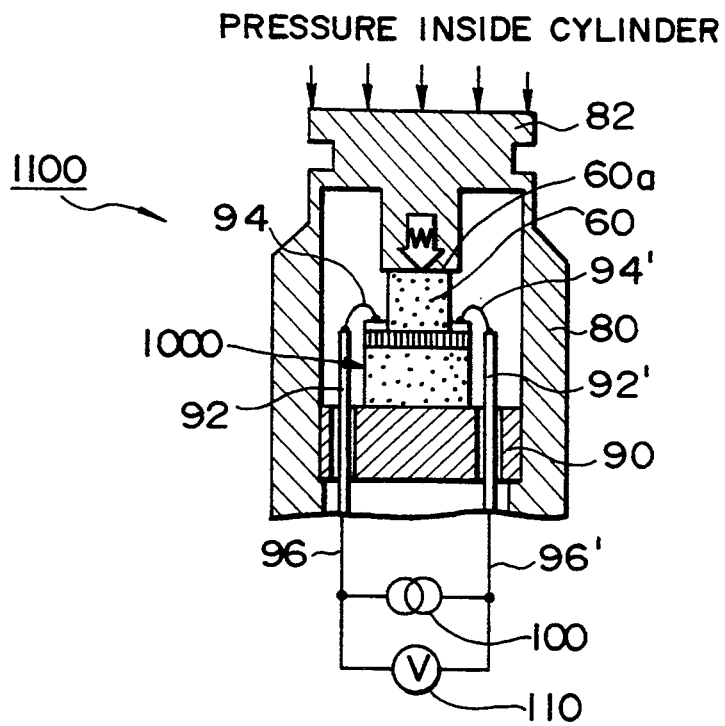
FIG. 2 is a schematic cross-sectional view showing a combustion pressure sensor using the force transducer of FIG. 1.
Figure 3:
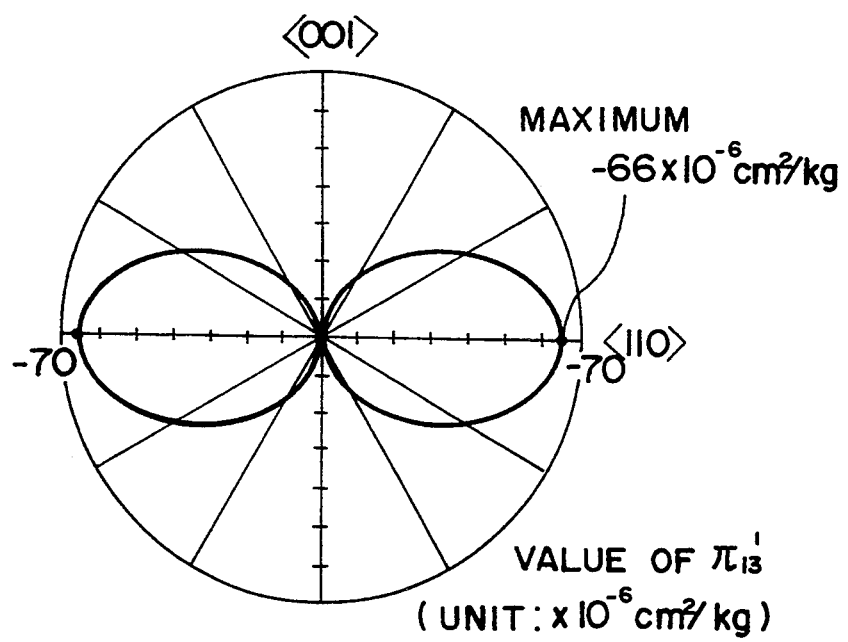
FIG. 3 is a circular graph showing various values of the piezoresistive coefficient $\pi 13'$ when it is measured as the direction of location of the input-output shared electrodes 42, 42' mounted on the crystal face (110) of the silicon semiconductor is varied throughout the range of 360 degrees while the force is applied to the crystal face.
Figure 4:
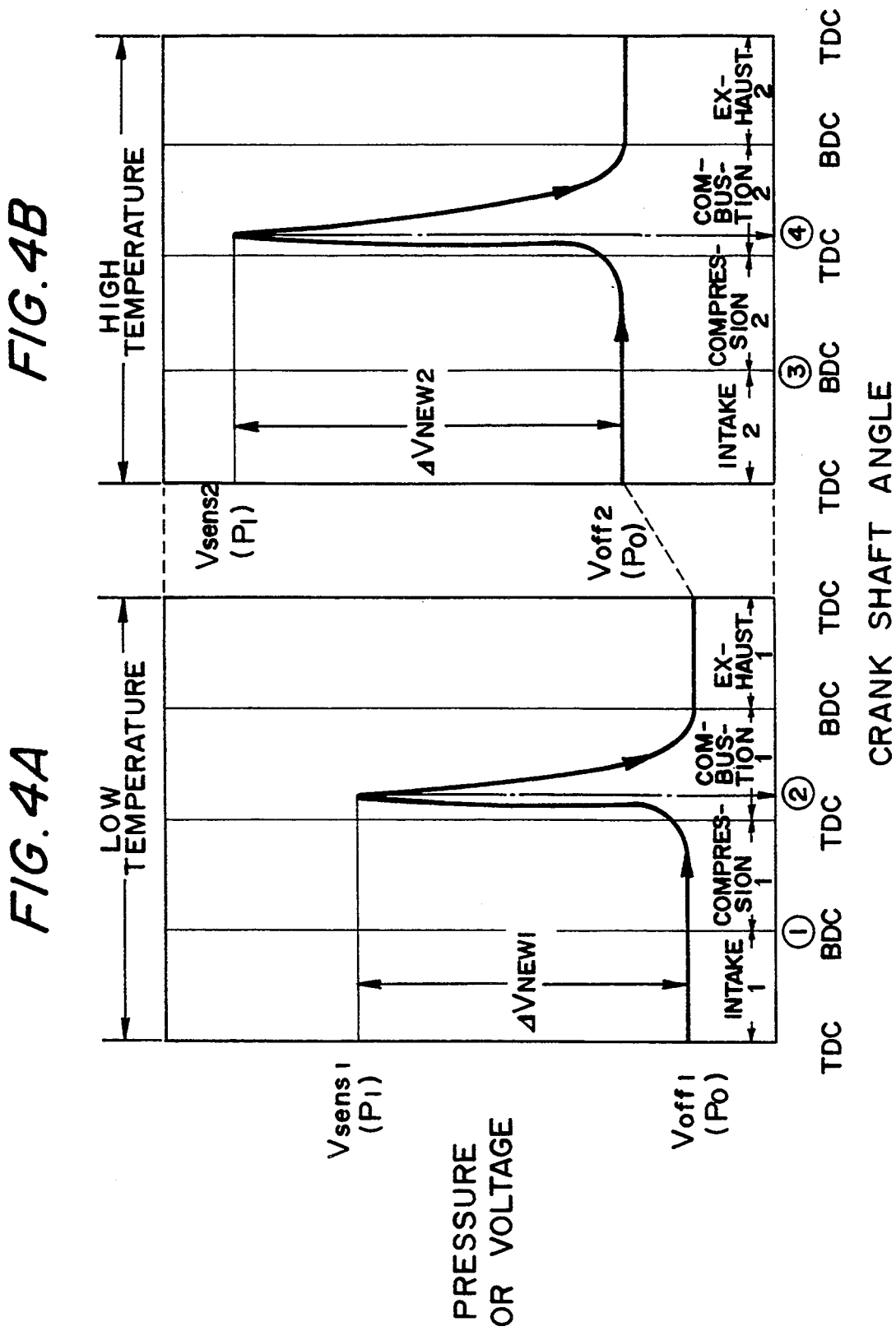
FIGS. 4A and 4B are a combined diagrams showing a voltage waveform for a four-cycle engine which is to be detected by the combustion pressure sensor of FIG. 2.
Figure 5:
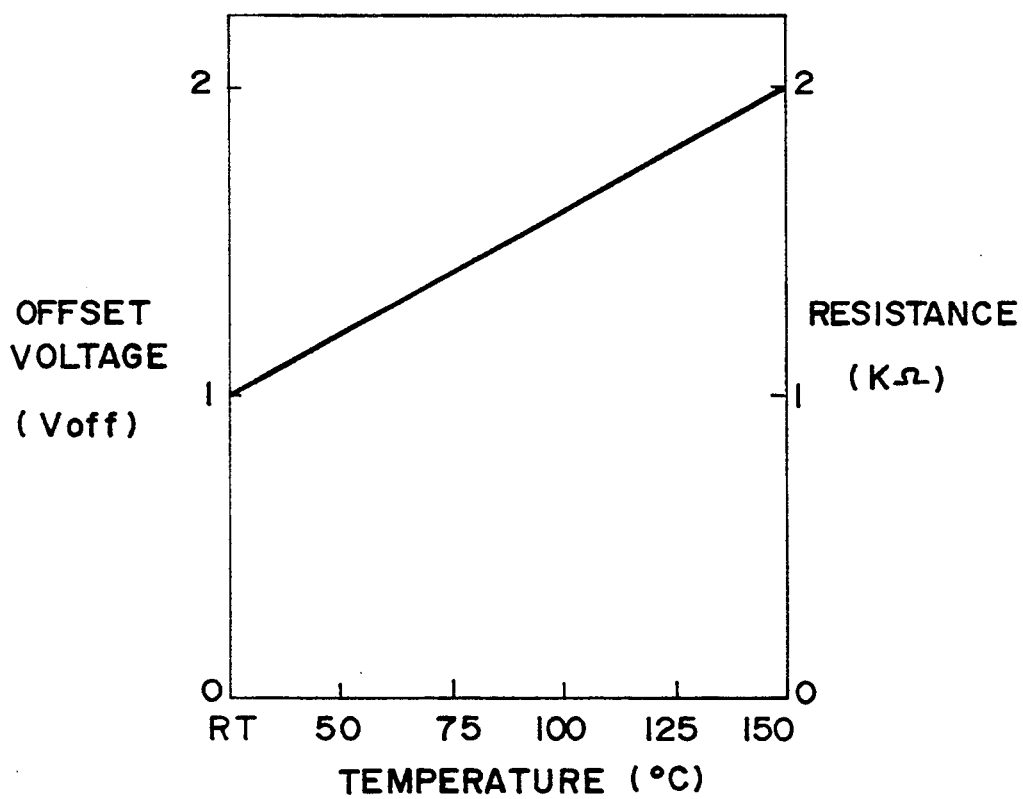
FIG. 5 is a characteristic graph showing the temperature-dependency of the offset voltage of the combustion pressure sensor.
Figure 6:
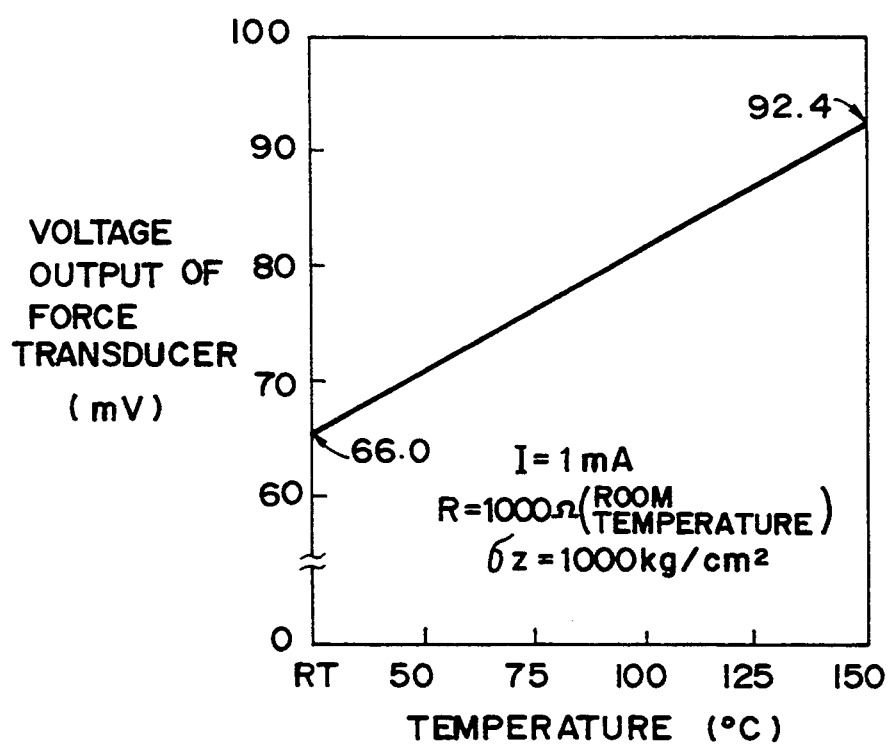
FIG. 6 is a characteristic graph showing the temperature dependency of the voltage output of the combustion pressure sensor.
Figure 7:
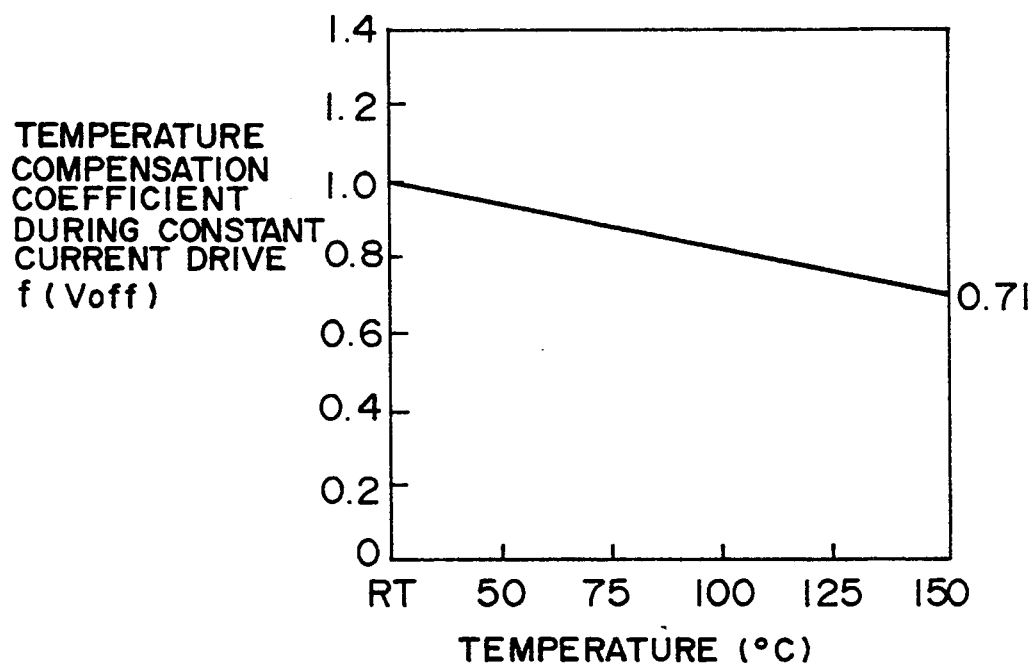
FIG. 7 is a graph showing the relationship between temperature compensation coefficient and temperature when the combustion pressure sensor is driven by constant current.
Figure 8:
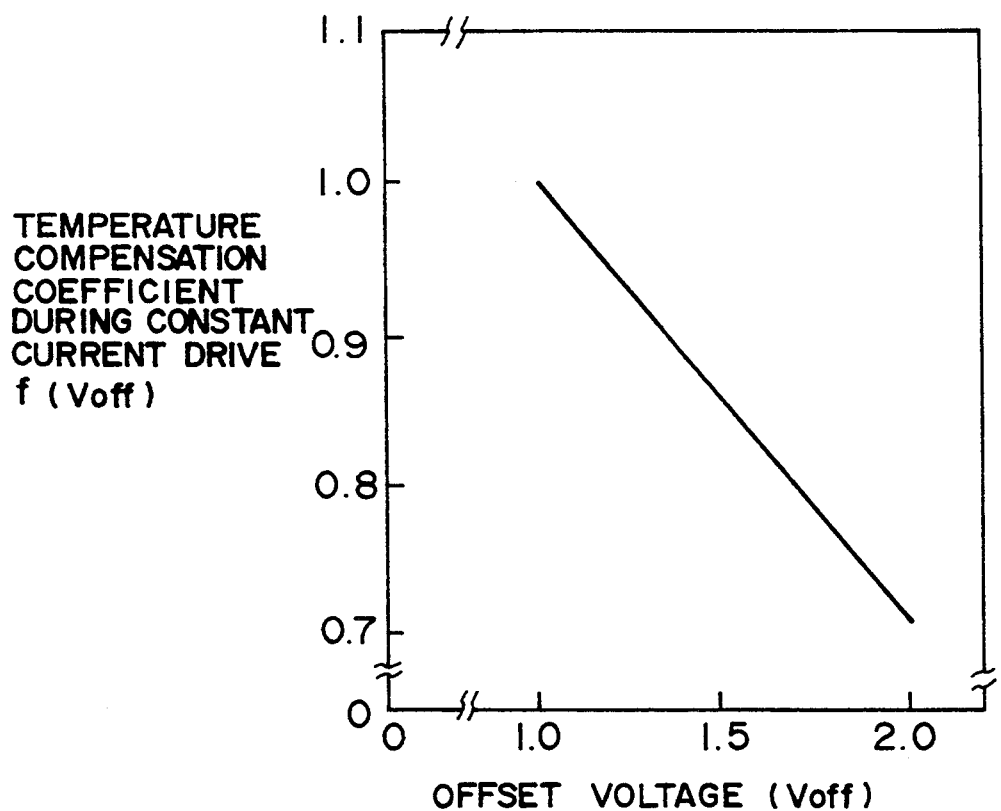
FIG. 8 is a graph showing the correlation between offset voltage and temperature compensation coefficient when the combustion pressure sensor is driven by constant current.
Figure 9:
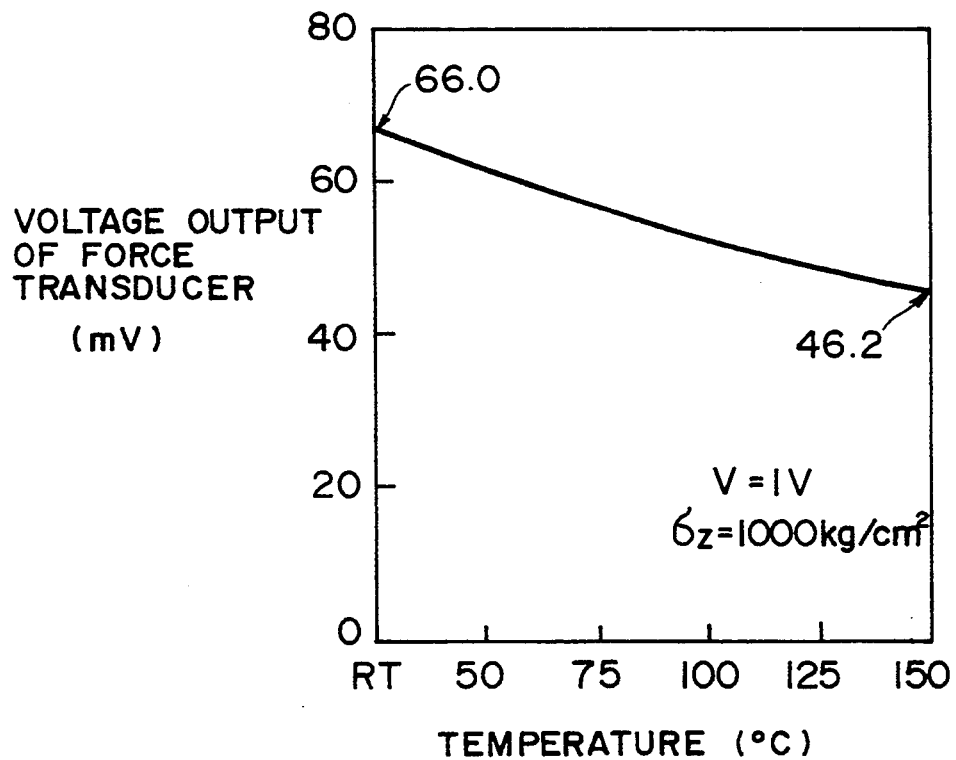
FIG. 9 is a characteristic graph showing the temperature-dependency of the voltage output when the combustion pressure sensor is driven using a constant voltage source and a voltage divider.
Figure 10:
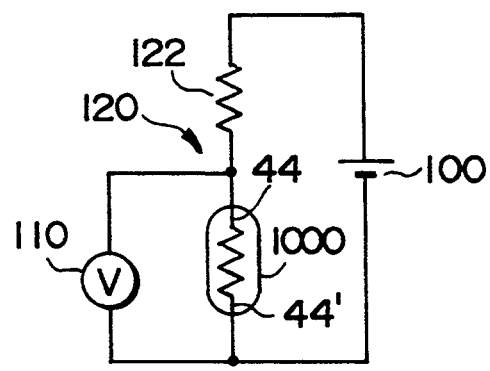
FIG. 10 is a diagram showing a circuit to be used when the combustion pressure sensor is driven using a constant voltage and a voltage divider.
Figure 11:
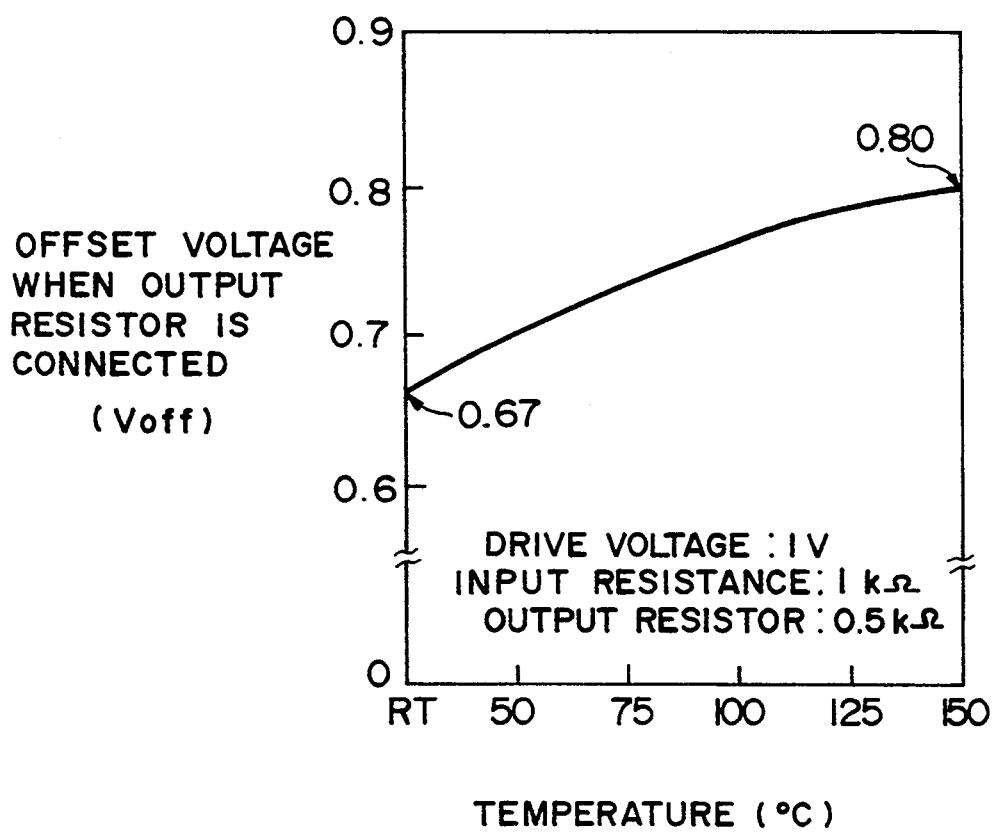
FIG. 11 is a characteristic graph showing the temperature-dependency of the offset voltage obtained from the circuit of FIG. 10.

FIG. 2 shows a combustion pressure sensor 1100 in which the force transducer 1000 is assembled as a pressure detecting means. The combustion pressure sensor 1100 comprises a tubular housing 80 with a metal diaphragm 82 and the force transducer 1000 fixedly mounted in the housing 80.

The housing 80 is mounted on the wall surface of a cylinder head of a non-illustrated engine in such a manner that a pressure P inside the cylinder is applied on the diaphragm 82.

The force transducer 1000 is fixedly mounted in the housing 80 using a sealed terminal 90, and the top face 60a of the force transmission block 60 is engageable with the back face of the diaphragm 82.

Accordingly, the pressure P inside the cylinder is converted into a force W by the metal diaphragm 82, is transmitted to the top face 60a of the force transducer 1000 and is finally applied, as a compressive stress $\sigma_Z$, on the (110) crystal face 40a of the silicon semiconductor 40.

A pair of lead pins 92, 92' is mounted on the sealed terminal 90. The lead pins 92, 92' are electrically connected at upper ends to the electrodes 42, 42' of the force transducer 1000 by a pair of bonding wires 94, 94' of about 50 μm in diameter and at lower ends to the power supply 100 and the voltage detector 110 via a pair of lead wires 96, 96', respectively.

The operation of the combustion pressure sensor 1100 of this embodiment will now be described.

Assuming that a pressure P inside the cylinder is applied on the diaphragm 82 of the combustion pressure sensor 1100, the pressure P is transmitted as a force W to the force transducer 1000 and is converted into a voltage output $\Delta V_{NEW}$, which is given by Equation 4, based on the piezoresistive effect of the silicon semiconductor 40. The voltage output $\Delta V_{NEW}$ will be superposed by the offset voltage $V_{off}$ and will be detected, as a voltage $V_{sens}$, by the voltage detector 110.

Assuming that a weight (W) of 100 kg is applied on the silicon semiconductor 40 having a resistance R of 1 kΩ between the electrodes 42, 42' while a current I of 1 mA flows in the silicon semiconductor 40, $\Delta V_{NEW}$, $V_{off}$ and $V_{sens}$ will be given by Equations 7, 8 and 9, respectively. The offset voltage $V_{off}$ is an inter-electrode voltage when the force W is zero, and $\sigma_Z$ is a stress generated in the silicon semiconductor 40 by the force W.

$$\begin{aligned}\Delta V_{NEW} &= I \times R \times \pi_{13}' \times \sigma_Z \\ &= 1\text{ mA} \times 1000\Omega \times \\ &\quad (-66) \times 10^{-6}\text{ cm}^2/\text{kg} \times -10000\text{ kg/cm}^2 \\ &= 0.66V\end{aligned} \quad \text{[Equation 7]}$$

$$V_{off} = I \times R = 1\text{ mA} \times 1000\Omega = 1\text{ V} \quad \text{[Equation 8]}$$

$$V_{sens} = V_{off} + \Delta V_{NEW} = 1\text{V} + 0.66\text{ V} = 1.66\text{ V} \quad \text{[Equation 9]}$$

From Equations 7, 8 and 9, the value of $V_{sens} - V_{off} = \Delta V_{NEW}$, i.e., the pressure P inside the cylinder can be obtained.

Since the piezoresistive coefficient $\pi_{13}'$ is about two-fold greater than the piezoresistive coefficient $\pi_{61}'$, thus obtained voltage output $\Delta V_{NEW}$ will be double the voltage output $\Delta V_{OLD}$ of the prior art combustion pressure sensor. It is therefore possible to measure the pressure P inside the cylinder accurately, with no influence such as by external turbulent magnetic field. Alternatively, a silicon semiconductor for which the piezoresistive coefficient $\pi_{13}'$ can be effectively utilized may have the p-type (111) face, the (211) face or the n-type (100) face; the p-type (110) face is greatest of all.

With the combustion pressure sensor 1100 of this embodiment, since the force transducer 1000 can be electrically connected by only two bonding wires 94, 94', which is half the number of wires in the prior art, it is possible to secure a sharply improved degree of reliability resulting from the connected portions by the bonding wires 94, 94'.

Second Embodiment

In the case where the combustion pressure sensor 1100 of FIG. 2 is mounted on the wall surface of the cylinder head of a reciprocating engine, the temperature of the assembled force transducer 1000 will rise up to a high temperature of 150° C. Since the resistance R and the piezoresistive coefficient $\pi_{13}'$ of the silicon semiconductor 40 are dependent on temperature, the voltage output $\Delta V_{NEW}$ of the combustion pressure sensor 1100 will vary sharply along with temperature. Due to the temperature-dependency of the resistance of the silicon semiconductor 40, the offset voltage $V_{off}$ of the combustion pressure sensor 1100 also will vary sharply.

In this embodiment, it is possible to temperature-compensate the voltage output of the combustion pressure sensor 1100 utilizing the temperature-dependency of the offset voltage $V_{off}$ so that the combustion pressure P can be measured with no influence by temperature change.

Figure 12A:
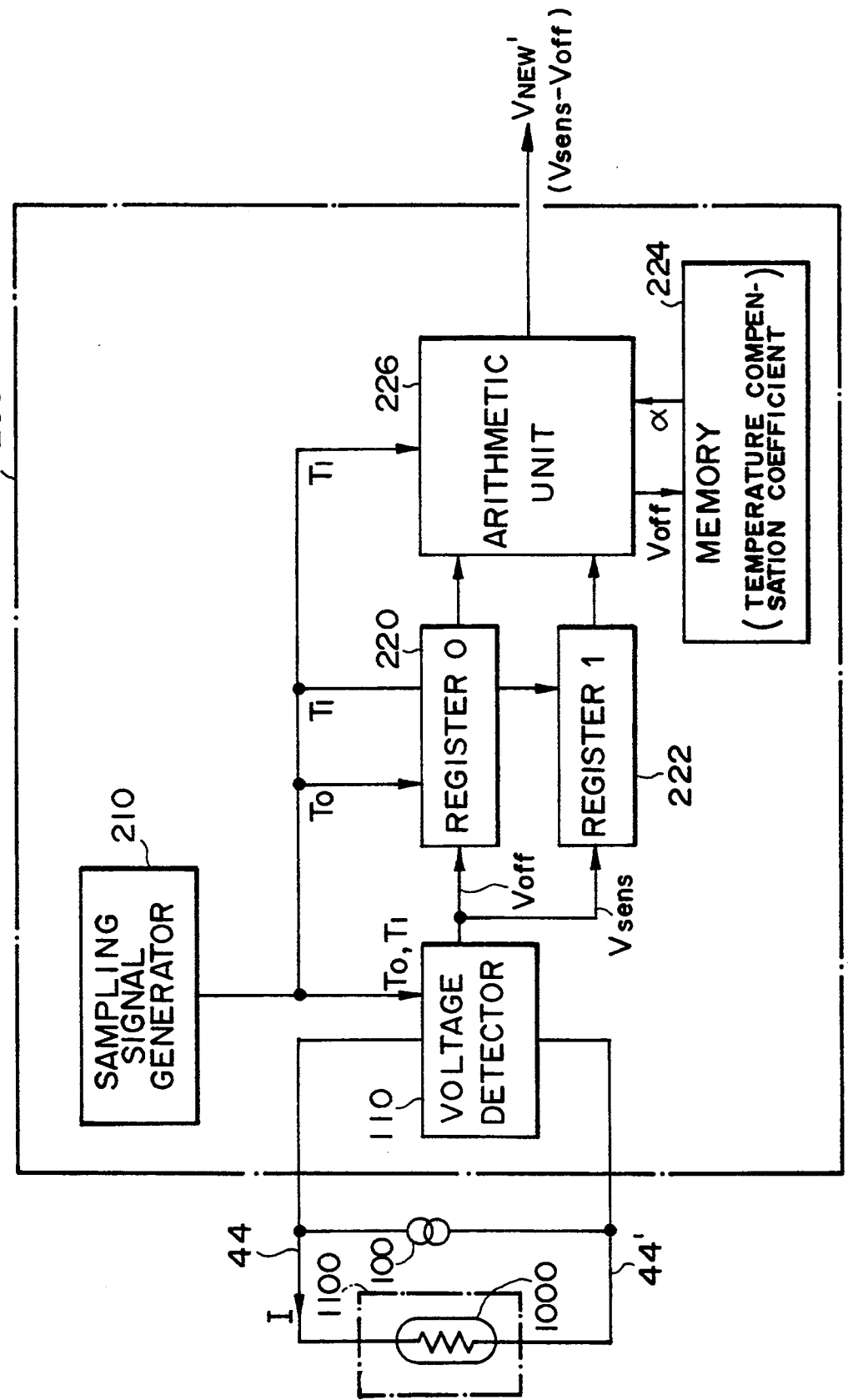
FIG. 12A is a block circuit diagram showing a pressure detecting circuit according to a preferred embodiment of this invention.

FIG. 12A shows a modified pressure detecting circuit of this embodiment.

This pressure detecting circuit comprises the force transducer 1000 which is assembled in the combustion pressure sensor 1100, a constant current source 100 for supplying a constant current to the input-output shared electrodes 42, 42' of the force transducer 1000, and a measuring circuit 200 for measuring a force W applied on the force transducer 1000.

The measuring circuit 200 includes a voltage detector 110, a sampling signal generator 210, registers 220, 222, an arithmetic unit 226, and a memory 224. The measuring circuit 200 temperature-compensates the voltage output from the force transducer 1000.

Figure 12B:
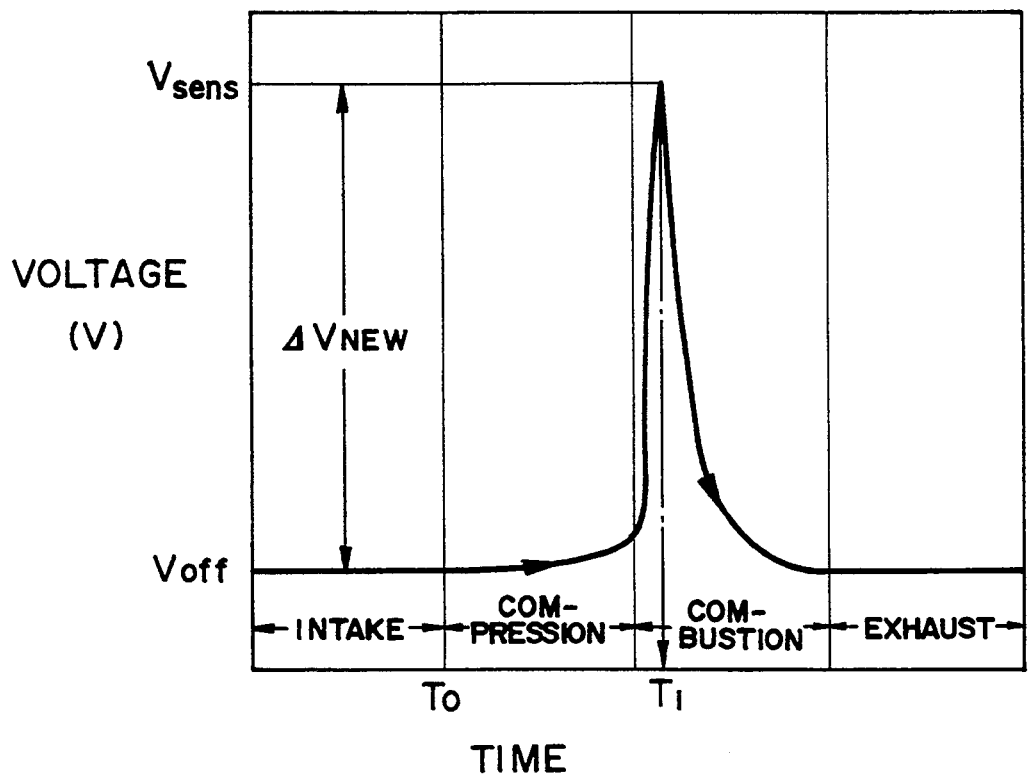
FIG. 12B is a diagram showing the waveform output from the combustion pressure sensor of FIG. 12A.
Figure 12C:
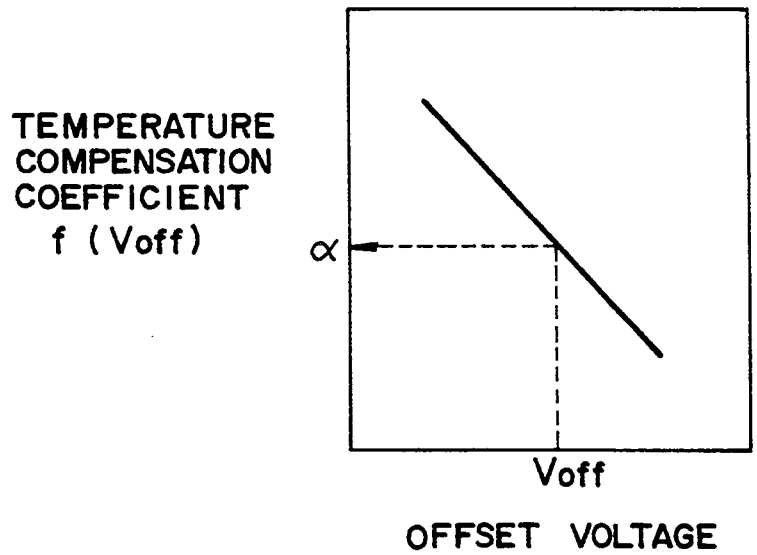
FIG. 12C is a diagram showing data to be stored in a memory of FIG. 12A.

FIG. 12B is a waveform diagram showing the voltage output from the force transducer 1000 with respect to the pressure P inside the cylinder. FIG. 12C is a diagram showing data representing the correlation between offset voltage $V_{off}$ and the temperature compensation coefficient.

Assuming that the pressure P inside the cylinder is applied on the combustion pressure sensor 1100 as driven by the constant current source 100 via two lead wires 44, 44', the pressure P will be converted into a voltage output $\Delta V_{NEW}$ of Equation 4, will be superposed by the offset voltage $V_{off}$ and will be detected, as a voltage $V_{sens}$ by the voltage detector 110.

Here the offset voltage $V_{off}$ and the voltage $V_{sens}$ are voltages obtained at a time $T_0$ and $T_1$ when they are measured in a four-cycle engine as shown in FIG. 12B, i.e., at the time of zero pressure and at the time of maximal pressure, respectively.

As shown in FIG. 12A, the voltage detector 110 is connected to the sampling signal generator 210 to which the registers 220, 222 and the arithmetic unit 226 are connected.

The voltage detector 110, which is also connected to the register 220, 222, detects the offset voltage $V_{off}$ and the voltage $V_{sens}$ in synchronism with the sampling signals output from the sampling signal generator 210 at the timing of $T_0$ and $T_1$ and stores the detected values in the respective registers 220, 222.

The arithmetic unit 226 is connected to the memory 224 in which a map of temperature compensation coefficient f ($V_{off}$) corresponding to the offset voltage $V_{off}$ and varying along with temperature is stored.

The arithmetic unit 226 reads the offset voltage $V_{off}$ and the voltage $V_{sens}$ from the respective registers 220, 222 when the sampling signals are generated at the timing of $T_1$ for every combustion cycle, and calculates the voltage output $\Delta V_{NEW} = (V_{sens} - V_{off})$.

The arithmetic unit 226 reads the temperature compensation coefficient $f(V_{off}) = \alpha$ corresponding to the offset voltage $V_{off}$, then substitutes the obtained voltage $(V_{sens} - V_{off})$ and the temperature compensation coefficient $f(V_{off}) = \alpha$ in Equation 5 and outputs the temperature-compensated voltage $V_{NEW}$ to an external circuit.

As described above, according to the pressure detecting circuit of this embodiment, even if the temperature of the combustion pressure sensor 1100 rises by the engine with high pressure and high temperature during the measurement of combustion pressure of the engine when the sensor 1100 is driven by constant current, it is possible to measure precisely the combustion pressure P, which is applied to the diaphragm 82, as temperature-compensated.

Third Embodiment

Figure 13A:
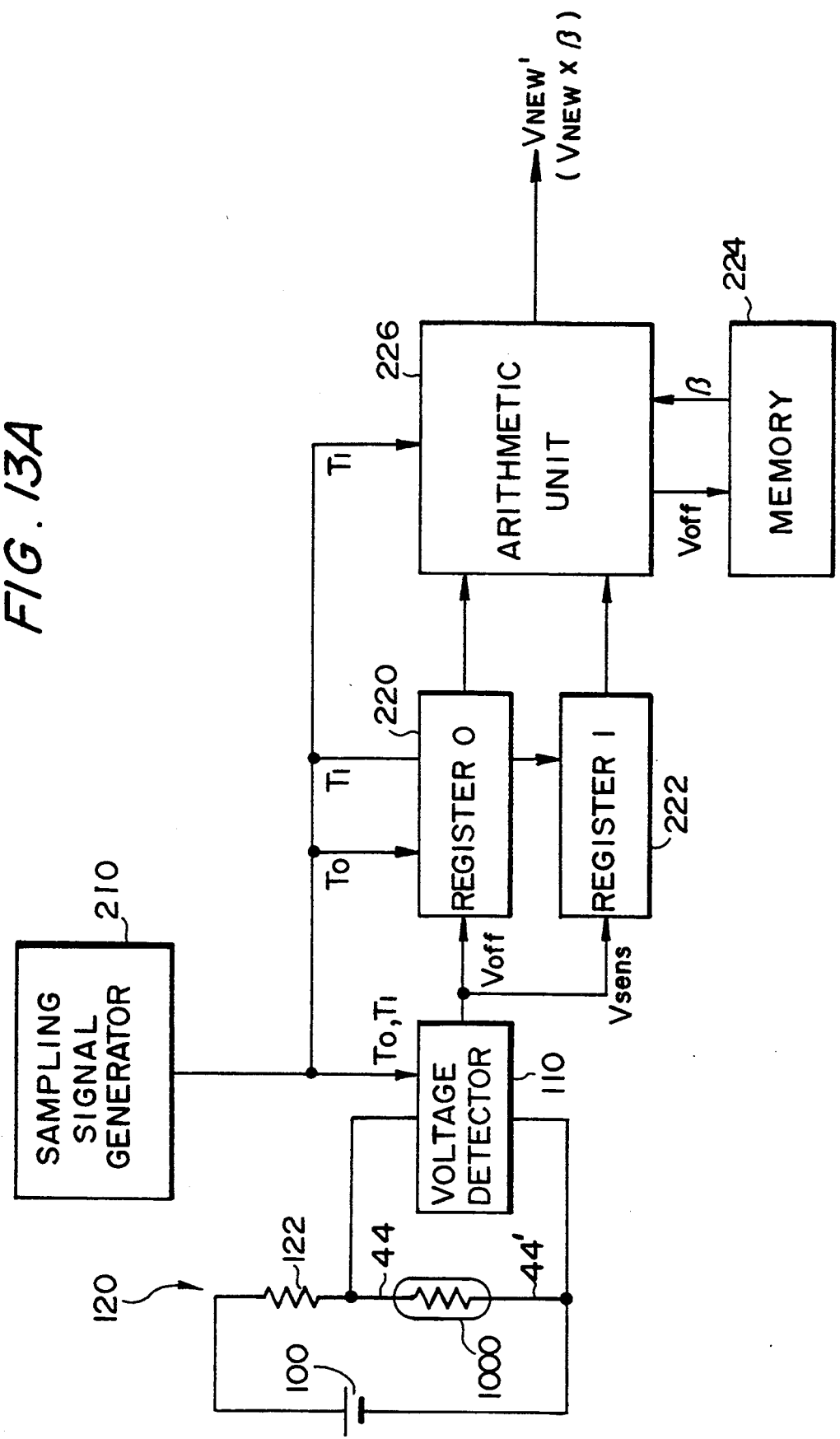
FIG. 13A is a block circuit diagram showing a modified pressure detecting circuit according to another embodiment of the invention.
Figure 13B:
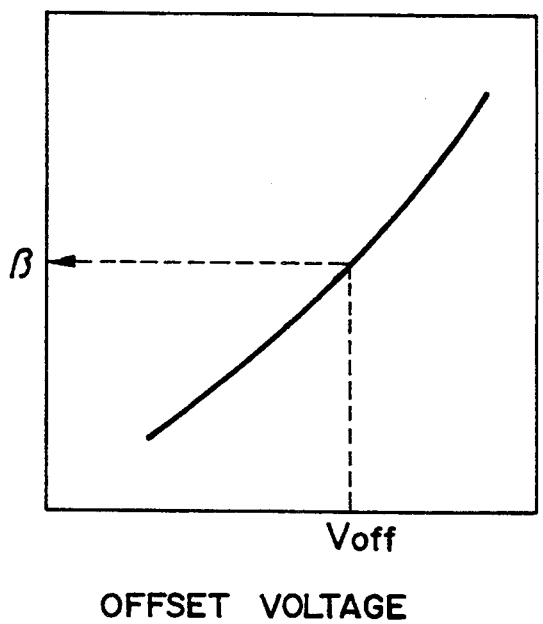
FIG. 13B is a diagram showing data to be stored in a memory of FIG. 13A.

FIG. 13 shows another modified pressure detecting circuit according to a third embodiment. The parts or elements corresponding to those of the pressure detecting circuit of FIG. 12A are designated by same reference numerals, and their description is omitted here for clarity.

In this embodiment, unlike the second embodiment, a constant voltage source is used as the power supply 100, and the voltage output is outputted to a voltage divider 120.

The voltage divider 120 comprises a force transducer 1000, and an output resistor 122 connected in series to the force transducer 1000. The output resistor 122 is situated at a position substantially same as that of the power supply 100 so that it will scarcely be influenced by any temperature change of the engine.

In the memory 224, a map of temperature compensation coefficient $f(V_{off})$ corresponding to the offset voltage $V_{off}$ which varies along with temperature change is stored. In this embodiment, partly since the constant voltage source is used as the power supply 100 and partly since the output resistor 122 is connected in series to the drive circuit, the temperature compensation coefficient will be different from that in the second embodiment employing the constant current source.

From the combustion pressure sensor 1100 of this embodiment, the same voltage as that of FIG. 12B will be output for every combustion cycle.

When sampling signals are output from the sampling signal generator 210 at the timing of $T_0$ and $T_1$, the voltage detector 110 will detect the offset voltage $V_{off}$ and the voltage $V_{sens}$ in synchronism with the sampling signals, and these detected voltage values will be stored in the respective registers 220, 222.

The arithmetic unit 226 reads from the memory 224 the temperature compensation coefficient $f(V_{off}) = \beta$ corresponding to the offset voltage $V_{off}$, substitutes the offset voltage $V_{off}$, the voltage $V_{sens}$ and the temperature compensation coefficient $f(V_{off}) = \beta$ in Equation 5, and calculates and outputs a temperature-compensated voltage $\Delta V_{NEW}$.

As described above, according to the pressure detecting circuit of this embodiment, even if the constant voltage source is used as the power supply 100, it is possible to measure the pressure, which is applied on the diaphragm of the combustion pressure sensor 1100, accurately, like the second embodiment, with no influence by temperature change.

Figure 14A:
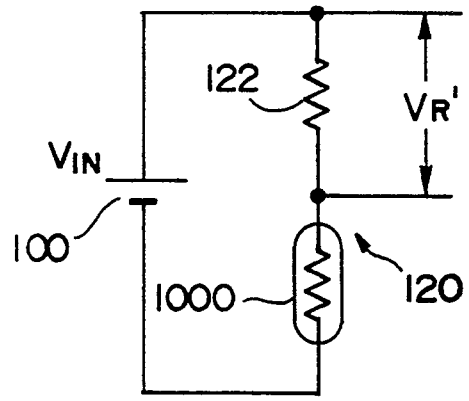
FIG. 14A is a diagram showing a circuit for measuring the pressure from voltages at opposite ends of the voltage dividing resistor of a voltage divider.

In this embodiment, the combustion pressure is measured based on the output voltage of the force transducer 1000. Alternatively, as shown in FIG. 14A, the temperature-dependency of divided voltage VR' of the output resistor 122 may be utilized, and so it is possible to obtain the same temperature-compensated voltage output.

Figure 14B:
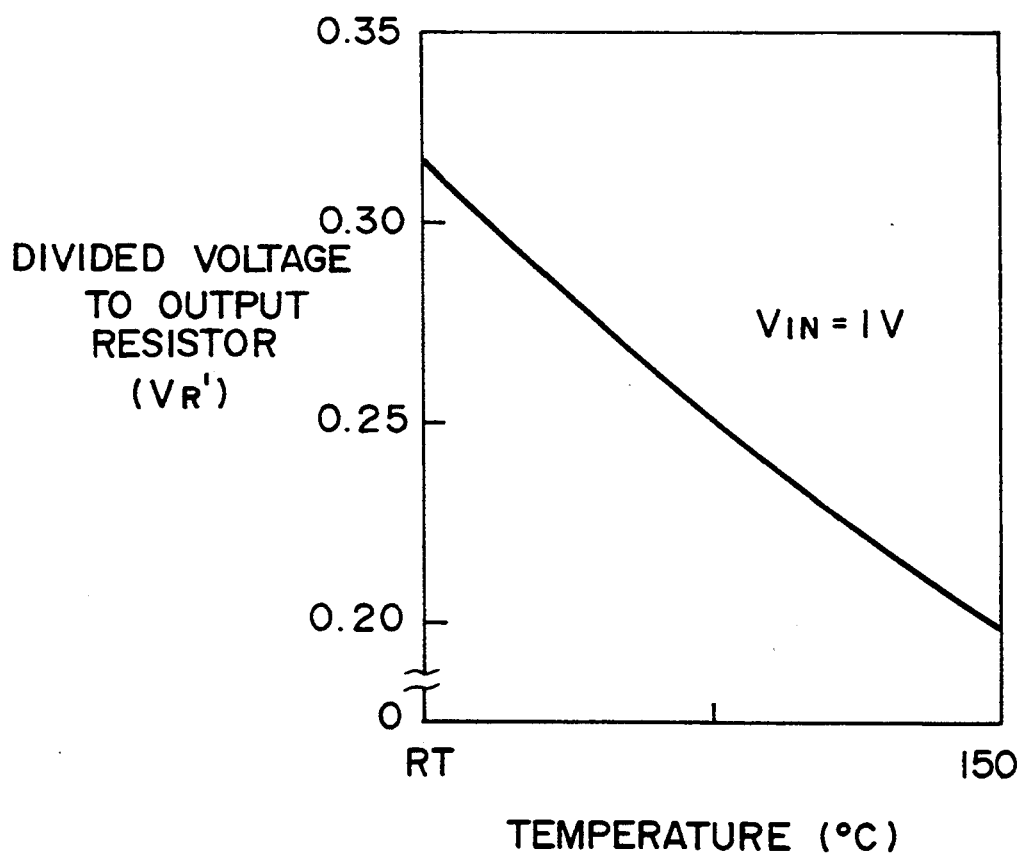
FIG. 14B is a characteristic graph showing the relationship between temperature of a silicon semiconductor, which constitutes the main part of the force transducer, and voltages at opposite ends of the voltage divider.

FIG. 14B shows the temperature-dependency of the divided voltage VR' obtained while the temperature of the silicon semiconductor 40 is varied under the conditions that the input resistance of the force transducer 1000 including the silicon semiconductor 40 having a resistivity of about 8 $\Omega$cm is 1 k$\Omega$ at room temperature and the resistance value of the output resistor 122 is 500 $\Omega$. Using this divided voltage VR' in the same arithmetic operation as that in this embodiment, it is possible to measure the combustion pressure accurately with no influence by temperature change.

Fourth Embodiment

However, if the engine is driven at a higher rate of rotation under an increased load, the temperature of the force transducer 1000 assembled in the housing 80 will rise further. Therefore, as long as the silicon semiconductor 40 having a resistivity of 8 $\Omega$cm is used, the input resistance will drop sharply at about 200° C. so that measurement of combustion pressure would be impossible.

The temperature range in which the combustion pressure sensor 1100 is to be used can be widened to the high-temperature side by reducing the resistivity of the silicon semiconductor 40 (i.e., increasing the impurity concentration). By increasing the impurity concentration, it is possible to reduce the temperature-dependency of piezoresistive coefficient.

In the field of semiconductor pressure sensor, it is known to temperature-compensate the voltage output as a p-type strain gauge having an impurity concentration of about $5 \times 10^{18}$ atoms/cm$^3$ or $2 \times 10^{20}$ atoms/cm$^3$ is driven by constant current, without necessity of a separate compensator.

However, with the force transducer 1000 constituting the main part of the combustion pressure sensor 1100, if the technology for increasing the impurity concentration is applied to a rectangular planar silicon semiconductor 40, the thickness of the silicon semiconductor 40 has a thickness of several hundreds $\mu$m so that the input resistance will be sharply reduced to less than several $\Omega$.

Assuming that this small-input-resistance force transducer 1000 is driven by a battery of about 10 V, the battery power supply requires a large current capacitance exceeding several amperes. Consequently, with the ordinary battery power supply, it is difficult to drive the force transducer 1000, and electric power consumption would be massive to cause the temperature of the silicon semiconductor 40 to rise, thus impairing the pressure detecting function.

Therefore, assuming an impurity concentration such that the voltage output can be temperature-compensated without a separate compensator, it is important that the rectangular planar silicon semiconductor 40 should be a thin layer. Preferably, the silicon semiconductor 40 should have a thickness of 0.05 to 1 $\mu m$; for example, if the input resistance is 500 $\Omega$ and the impurity concentration is about $5 \times 10^{18}$ atoms/cm$^3$, a thickness of around 0.3 $\mu m$ is required.

In this embodiment, this thin silicon semiconductor 40 should be formed in an SOI structure. The silicon semiconductor layer, which has the SOI structure and has a function of detecting a force by utilizing the piezoresistive effect, is driven by constant current to control the impurity concentration to about $5 \times 10^{18}$ atoms/cm$^3$ or about $2 \times 10^{20}$ atoms/cm$^3$ such that the voltage output can be temperature-compensated. The silicon semiconductor layer in the SOI structure is realized by using the epitaxial growth technology, the silicon wafer direct bonding (SDB) technology and the SIMOX technology.

Figure 15:
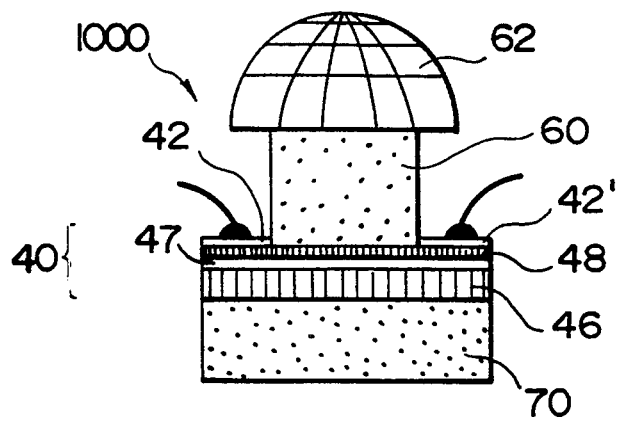
FIG. 15 is a diagram showing a modified force transducer according to another embodiment of the invention.
Figure 16A:
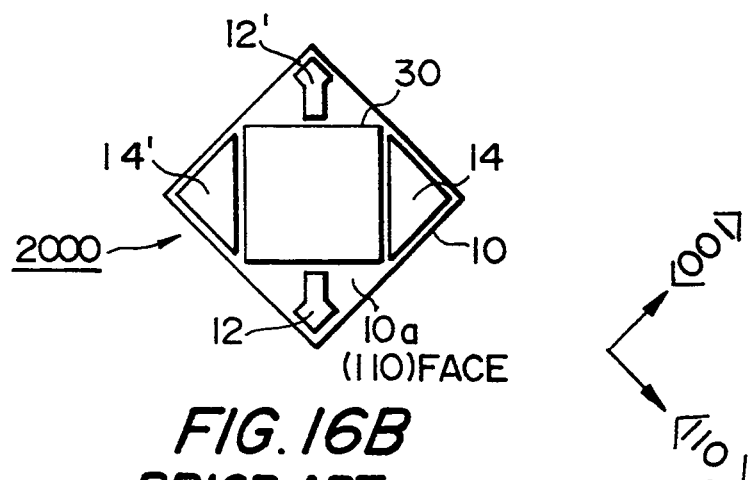
FIG. 16A is a schematic plan view showing a prior art force transducer.
Figure 16B:
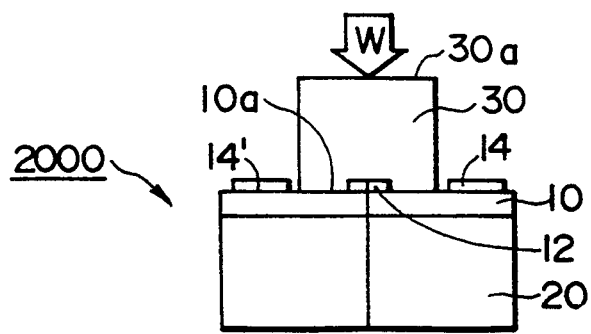
FIG. 16B is a side view of FIG. 16A.

FIG. 15 is a side view showing a modified force transducer 1000 according to another embodiment. The parts or elements similar to those of FIG. 1 are designated by same reference numerals, and their description is omitted here for clarity.

The silicon semiconductor 40 of this embodiment has an SOI structure which includes a substrate silicon wafer 46 having a thickness of 400 $\mu m$ and having a crystal face of (110), an oxide film layer 47 having a thickness of about 1 $\mu m$ and coated over the substrate silicon wafer 46, and a p-type silicon layer 48 having a thickness of about 0.3 $\mu m$ and acting as a device on the oxide film layer 47. The silicon layer 48 has a crystal face of (110) and has an impurity concentration of about $5 \times 10^{18}$ atoms/cm$^3$.

The force transducer 1000 of this embodiment has a hemispherical head 62 at the top of the force transmission block 60. As a result, the contact area of the metal diaphragm 82 of FIG. 2 with the force transmission block 60 is reduced so that direct heat conduction from the high-temperature metal diaphragm 82 to the force transducer 1000 is minimized, thus restraining the force transducer 1000 from temperature rise.

Because the impurity concentration of the silicon semiconductor 40 is selected as a constant-current-self-sensitivity-compensated concentration, the force transducer 1000 is accommodated in the housing to constitute a combustion pressure sensor, and the combustion pressure sensor is driven by constant current. It is therefore possible to obtain an accurate voltage output corresponding to the combustion pressure without any voltage output compensator which utilizes the temperature-dependency of the offset voltage like the second and third embodiments.

This invention should by no means be limited to the foregoing illustrated embodiments, and various modifications may be suggested within the scope of the gist of this invention.

For example, in each of the foregoing embodiments, this invention is applied to a combustion pressure sensor, but wide applications of the invention in other fields are possible.

What is claimed is:

1. A force transducer comprising:
   (a) a silicon semiconductor having a face of (110) or a crystal face equivalent to the face of (110), on which a force is to be applied;
   (b) a pair of input-output shared electrodes mounted on the crystal face of said silicon semiconductor in mutual confronting relationship in a direction of <110> of the crystal or a direction equivalent to the direction of <110>;
   (c) a force transmission block connected to the crystal face of said silicon semiconductor for transmitting the force perpendicularly to the crystal face;
   (d) a support bed supporting said silicon semiconductor and connected to said silicon semiconductor at a face opposite to the crystal face to which said force transmission block is connected, whereby a voltage corresponding to the force and to be measured is output from said input-output shared electrodes when the force is applied perpendicularly to the crystal face of said silicon semiconductor via said force transmission block while a current flows in said silicon semiconductor via said input-output shared electrodes; and
   (e) wherein said pair of input-output shared electrodes are configured for a two-probe measurement.

2. A force transducer according to claim 1, wherein said silicon semiconductor has an SOI (silicon on insulator) structure having a silicon semiconductor layer for detecting the force by utilizing the piezoresistive effect, said silicon semiconductor layer being a p-type semiconductor controlled to an impurity concentration of about $5 \times 10^{18}$ atoms/cm$^3$.

3. A force transducer according to claim 1, wherein said silicon semiconductor has an SOI (silicon on insulator) structure having a silicon semiconductor layer for detecting the force by utilizing the piezoresistive effect, said silicon semiconductor layer being a p-type semiconductor controlled to an impurity concentration of about $2 \times 10^{20}$ atoms/cm$^3$.

4. A force transducer according to claim 1, wherein said force transmission block is made of glass ceramic.

5. A force transducer according to claim 1, wherein said support bed is made of glass ceramic.

6. A force transducer according to claim 1, wherein said silicon semiconductor, said force transmission block and said support bed are fixed by electrostatic connection.

7. A force transducer according to claim 1, wherein said force transducer is accommodated in a tubular housing having at one end a diaphragm and at the other end a sealed terminal equipped with a pair of lead pins, said support bed being fixed to said sealed terminal, and said force transmission block being situated so as to come into contact with said diaphragm.

8. A force transducer according to claim 7, wherein said force transmission block has at its top a hemispherical contact head so as to have a reduced contact area with said diaphragm.

9. A pressure detecting circuit comprising:
   (I) a force transducer including (a) a silicon semiconductor having a face of (110), or a crystal face equivalent to the face of (110) on which a force is to be applied, (b) a pair of input-output shared electrodes mounted on the crystal face of said silicon semiconductor in mutual confronting relationship in a direction of <110> of the crystal or a direction equivalent to the direction of <110>,
   (c) a force transmission block connected to the crystal face of said silicon semiconductor for transmitting the force perpendicularly to the crystal face, and (d) a support bed supporting said silicon semiconductor and connected to said silicon semiconductor at a face opposite to the crystal face to which said force transmission block is connected, whereby a voltage corresponding to the force and to be measured is output from said input-output shared electrodes when the force is applied perpendicularly to the crystal face of said silicon semiconductor via said force transmission block while a current flows in said silicon semiconductor via said input-output shared electrodes;

(II) a constant current source for supplying a constant current to said input-output shared electrodes;

(III) means for measuring the force, which is applied perpendicularly to the crystal face, based on the voltage output from said input-output shared electrodes; and (e) wherein said pair of input-output shared electrodes are configured for a two-probe measurement.

10. A pressure detecting circuit according to claim 9, wherein said means for measuring the force including:

(a) a coefficient memory in which a relation between the offset voltage and a temperature compensation coefficient is stored;

(b) a voltage detector for detecting the offset voltage output from said input-output shared electrodes and for detecting the voltage output from said input-output shared electrodes when the force is applied to the crystal face; and (c) a temperature compensator for reading a temperature compensation coefficient corresponding to the detected offset voltage from said coefficient memory and for temperature-compensating the output of said voltage detector to calculate and output a voltage corresponding to the force, whereby the force applied perpendicularly to the crystal face is measured, based on the output of said temperature compensator, with no influence by temperature change.

11. A pressure detecting circuit according to claim 9, wherein said force transducer is accommodated in a tubular housing having at one end a diaphragm and at the other end a sealed terminal equipped with a pair of lead pins, said support bed being fixed to said sealed terminal, said force transmission block being situated so as to come into contact with said diaphragm.

12. A pressure detecting circuit according to claim 10, wherein said force transducer is accommodated in a tubular housing having at one end a diaphragm and at the other end a sealed terminal equipped with a pair of lead pins, said support bed being fixed to said sealed terminal, said force transmission block being situated so as to come into contact with said diaphragm.

13. A pressure detecting circuit according to claim 12, wherein said tubular housing is adapted to be mounted in the engine cylinder in such a manner that combustion gas acts on said diaphragm when the pressure of combustion gas is to be measured.

14. A pressure detecting circuit according to claim 13, wherein said means for measuring the force includes:

(a) a sampling signal generator for generating first and second timing signals respectively at the time of generation of zero pressure and at the time of generation of maximum pressure in the cylinder for every combustion cycle;

(b) a first register for memorizing an offset voltage $V_{off}$ to be output from said voltage detector when said first timing signal is generated; and (c) a second register for memorizing a measured voltage $V_{sens}$ to be output from said voltage detector when said second timing signal is generated;

wherein said coefficient memory stores a map of temperature compensation coefficient $f(V_{off})$ corresponding to the offset voltage $V_{off}$ varying with temperature; and wherein said temperature compensator reads the offset voltage $V_{off}$, which is stored in said first register, and the measured voltage $V_{sens}$, which is stored in said second register, and calculates a voltage output $\Delta V_{NEW} = (V_{sens} - V_{off})$ for every combustion cycle, and said temperature compensator also reads from said coefficient memory the temperature compensation coefficient $f(V_{off})$ corresponding to the offset voltage, and substitutes the obtained voltage and the temperature compensation coefficient respectively for $(V_{sens} - V_{off})$ and $f(V_{off})$ in the equation given below to output the measured voltage $V_{NEW}$ as temperature-compensated.

$$\Delta V_{NEW} = (V_{sens} - V_{off}) \times f(V_{off})$$

15. A pressure detecting circuit comprising:

(I) a force transducer including (a) a silicon semiconductor having a face of (110), or a crystal face equivalent to the face of (110), on which a force is to be applied, (b) a pair of input-output shared electrodes mounted on the crystal face of said silicon semiconductor in mutual confronting relationship in a direction of <110> of the crystal or a direction equivalent to the direction of <110>, (c) a force transmission block connected to the crystal face of said silicon semiconductor for transmitting the force perpendicularly to the crystal face, and (d) a support bed supporting said silicon semiconductor and connected to said silicon semiconductor at a face opposite to the crystal face to which said force transmission block is connected, whereby a voltage corresponding to the force and to be measured is output from said input-output shared electrodes when the force is applied perpendicularly to the crystal face of said silicon semiconductor via said force transmission block while a current flows in said silicon semiconductor via said input-output shared electrodes; and (II) a voltage divider in which a resistor is connected in series to said force transducer;

(III) a constant voltage source for impressing a constant voltage to said voltage divider;

(IV) means for measuring the force, which is applied perpendicularly to the crystal face, based on the voltage output from said voltage divider; and (e) wherein said pair of input-output shared electrodes are configured for a two-probe measurement.

16. A pressure detecting circuit according to claim 15, wherein said means for measuring the force includes:

(a) a coefficient memory in which a relationship between the offset voltage and a temperature compensation coefficient is stored;

(b) a voltage detector for detecting the offset voltage output from said voltage divider and for detecting the measured voltage output from said voltage divider when the force is applied on said crystal face; and (c) a temperature compensator for reading a temperature compensation coefficient corresponding to the detected offset voltage from said coefficient memory and for temperature-compensating the output of said voltage detector to calculate and output a voltage corresponding to the force, whereby the force applied perpendicularly to the crystal face is measured, based on the output of said temperature compensator, with no influence by temperature change.

17. A pressure detecting circuit according to claim 15, wherein said force transducer is accommodated in a tubular housing having at one end a diaphragm and at the other end a sealed terminal equipped with a pair of lead pins, said support bed being fixed to said sealed terminal, said force transmission block being situated so as to come into contact with said diaphragm.

18. A pressure detecting circuit according to claim 16, wherein said force transducer is accommodated in a tubular housing having at one end a diaphragm and at the other end a sealed terminal equipped with a pair of lead pins, said support bed being fixed to said sealed terminal, said force transmission block being situated so as to come into contact with said diaphragm.

19. A pressure detecting circuit according to claim 18, wherein said tubular housing is adapted to be mounted in the engine cylinder in such a manner that combustion gas acts on said diaphragm when the pressure of combustion gas is to be measured.

20. A pressure detecting circuit according to claim 19, wherein said means for measuring the force includes:

(a) a sampling signal generator for generating first and second timing signals respectively at the time of generation of zero pressure and at the time of generation of maximum pressure in the cylinder for every combustion cycle;

(b) a first register for memorizing an offset voltage $V_{off}$ to be output from said voltage detector when said first timing signal is generated; and (c) a second register for memorizing a measured voltage $V_{sens}$ to be output from said voltage detector when said second timing signal is generated;

wherein said coefficient memory stores a map of temperature compensation coefficient $f(V_{off})$ corresponding to the offset voltage $V_{off}$ varying with temperature; and wherein said temperature compensator reads the offset voltage $V_{off}$, which is stored in said first register, and the measured voltage $V_{sens}$, which is stored in said second register, and calculates a voltage output $\Delta V_{NEW} = (V_{sens} - V_{off})$ for every combustion cycle, and said temperature compensator also reads from said coefficient memory the temperature compensation coefficient $f(V_{off})$ corresponding to the offset voltage, and substitutes the obtained voltage and the temperature compensation coefficient respectively for $(V_{sens} - V_{off})$ and $f(V_{off})$ in the equation given below to output the measured voltage $V_{NEW}$ as temperature-compensated.

$$\Delta V_{NEW} = (V_{sens} - V_{off}) \times f(V_{off})$$

21. A force transducer according to claim 1, wherein the pair of input-output shared electrodes are mounted on a crystal face of the silicon semiconductor so that when a current flow is passed between them, a voltage shift is generated which is the superposition of an offset voltage, V, and $\Delta V_{NEW}$, where $\Delta V_{NEW} = V \times \pi_{13}' \times \sigma_Z$, where $\pi_{13}'$ is a piezo-resistance coefficient of a silicon semiconductor for uniaxial current flow and voltage shift along a first direction due to an applied stress that is directed perpendicular to the direction of the current flow and the voltage shift, and $\sigma_Z$ is a stress that is applied along a direction that is perpendicular to the first direction.

22. A force transducer according to claim 9, wherein the pair of input-output shared electrodes are mounted on a crystal face of the silicon semiconductor so that when a current flow is passed between them, a voltage shift is generated which is the superposition of an offset voltage, V, and $\Delta V_{NEW}$, where $\Delta V_{NEW} = V \times \pi_{13}' \times \sigma_Z$, is a piezo-resistance coefficient of a silicon semiconductor for uniaxial current flow and voltage shift along a first direction due to an applied stress that is perpendicular to the first direction and $\sigma_Z$ is a stress that is applied along a direction that is perpendicular to the first direction.

23. A force transducer according to claim 15, wherein the pair of input-output shared electrodes are mounted on a crystal face of the silicon semiconductor so that when a current flow is passed between them, a voltage shift is generated which is the superposition of an offset voltage, V, and $\Delta V_{NEW}$, where $\Delta V_{NEW} = V \times \pi_{13}' \times \sigma_Z$, where $\pi_{13}'$ is a piezo-resistance coefficient of a silicon semiconductor for uniaxial current flow and voltage shift along a first direction due to an applied stress that is perpendicular to the first direction and $\sigma_Z$ is a stress that is applied along a direction that is perpendicular to the first direction.

24. A pressure detecting circuit according to claim 9, wherein the silicon semiconductor has a piezoresistive coefficient $\pi_{13}'$.

25. A pressure detecting circuit according to claim 9, wherein said means for measuring the force comprises means for determining the force as a function of the voltage output from said input-output shared electrodes and the piezoresistance coefficient $\pi_{13}'$.

* * * * *